(12) United States Patent
Lucey et al.

(10) Patent No.: US 10,204,300 B2
(45) Date of Patent: Feb. 12, 2019

(54) SYSTEM AND METHOD FOR PREDICTIVE SPORTS ANALYTICS USING CLUSTERED MULTI-AGENT DATA

(71) Applicant: STATS LLC, Chicago, IL (US)

(72) Inventors: Patrick Lucey, Chicago, IL (US); Long Sha, Brisbane (AU); Xinyu Wei, Melbourne (AU)

(73) Assignee: STATS LLC, Chicago, IL (US)

(*) Notice: Subject to any disclaimer, the term of this patent is extended or adjusted under 35 U.S.C. 154(b) by 0 days.

(21) Appl. No.: 15/627,296

(22) Filed: Jun. 19, 2017

(65) Prior Publication Data

US 2018/0032858 A1 Feb. 1, 2018

Related U.S. Application Data

(63) Continuation-in-part of application No. 15/379,448, filed on Dec. 14, 2016.

(60) Provisional application No. 62/351,724, filed on Jun. 17, 2016, provisional application No. 62/266,817, filed on Dec. 14, 2015.

(51) Int. Cl.
| | |
|---|---|
| G06N 3/04 | (2006.01) |
| A63F 13/35 | (2014.01) |
| G06N 3/08 | (2006.01) |
| A63F 13/25 | (2014.01) |
| A63F 13/812 | (2014.01) |
| G06N 99/00 | (2010.01) |
| A63F 13/65 | (2014.01) |

(52) U.S. Cl.
CPC .............. *G06N 3/04* (2013.01); *A63F 13/25* (2014.09); *A63F 13/35* (2014.09); *A63F 13/812* (2014.09); *G06N 3/08* (2013.01); *G06N 99/005* (2013.01); *A63F 13/65* (2014.09)

(58) Field of Classification Search
USPC ........................................................... 700/93
See application file for complete search history.

(56) References Cited

U.S. PATENT DOCUMENTS

| | | | | |
|---|---|---|---|---|
| 2004/0148278 | A1* | 7/2004 | Milo | ................... G06F 17/2205 |
| 2011/0173235 | A1* | 7/2011 | Aman | ................ A63B 24/0021 |
| | | | | 707/792 |
| 2017/0235848 | A1* | 8/2017 | Van Dusen | ............. H04L 41/04 |
| | | | | 705/12 |

* cited by examiner

*Primary Examiner* — Pierre E Elisca

(74) *Attorney, Agent, or Firm* — DLA Piper LLP US

(57) ABSTRACT

A system is described for interactively analyzing plays of a sporting event based on real-world positional tracking data. Using positional information regarding the players and/or ball and/or other objects obtained from a tracking system, along with identified event data and contextual information, the system processes a library of plays (e.g., one or more seasons' worth of a league's contests) into a searchable database of plays using multiple alignment templates and discriminative clustering techniques. A user interface is described for interacting with the database in a graphical manner, whereby users can query a graphical depiction of a play and receive the most similar plays from the library, along with statistical information relating to the plays. The user interface further permits the user to modify the query graphically (e.g., moving or exchanging players, ball trajectories, etc.) and obtain updated statistical information for comparison.

12 Claims, 27 Drawing Sheets

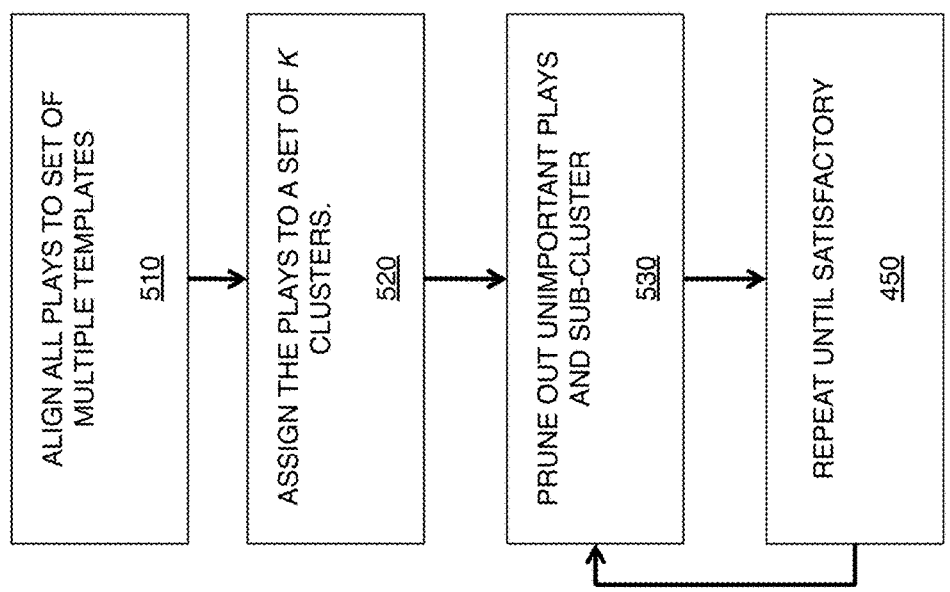

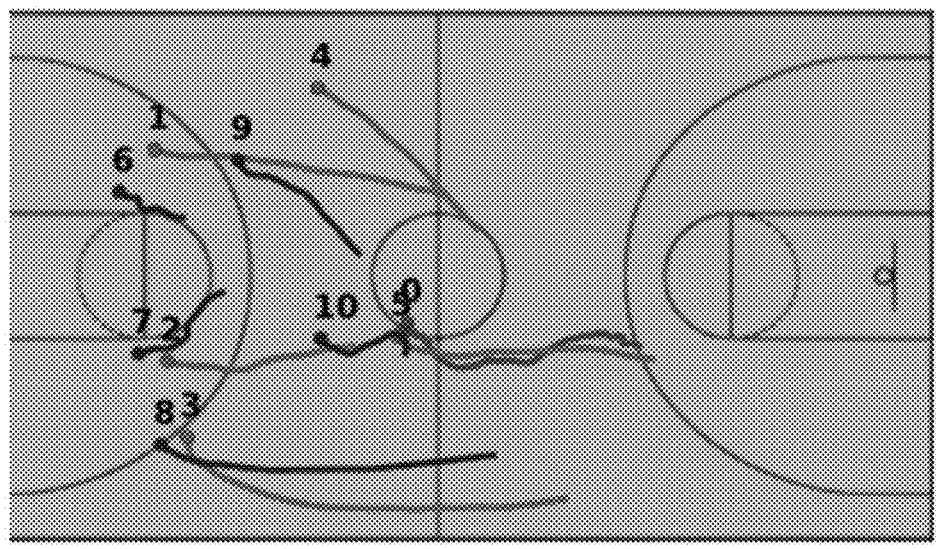
FIGURE 6a  Layer 1

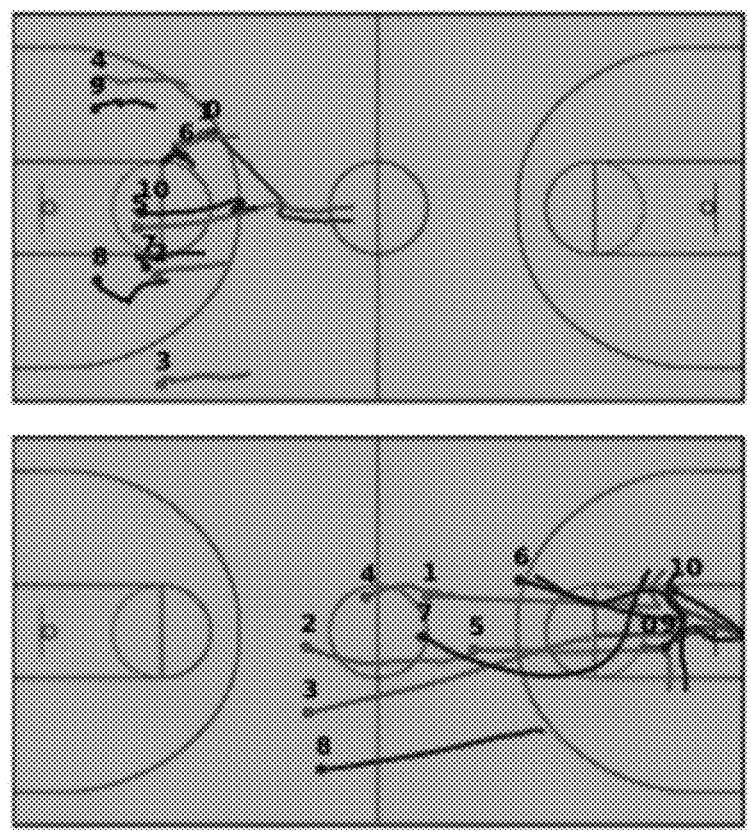
FIGURE 6c  Layer 3

Algorithm 1300 Template Learning Algorithm

1301. Procedure TemplateLearn($\mathcal{X}$)
1302.     Initialize the template with a randomly selected example $\Gamma = \hat{X}$
1303.     while $\nabla\Gamma <$ *threshold or iteration* $<$ *max* do
1304.         for each sample $X_n$ in dataset $\mathcal{X}$ do
1305.             Calculate cost $(i, j), = \|\Gamma(i) - X_n(j)\|_2$ for each player-role pair
1306.             Compute $P_n$ using the Hungarian algorithm
1307.             Align the example $X_n = P_n \bullet X_n$
1308.         end for
1309.         Update the template $\Gamma$ by averaging aligned $\mathcal{X}$
1310.         Compute the difference $\nabla\Gamma$
1311.     end while
1312.     return $\Gamma$
1313. end procedure

FIGURE 13

Algorithm 1400 Learning process of tree-based alignment

1401. Procedure LearnTree($\mathcal{X}$)
1402.   Initialize $\mathcal{T} = 0$, $C = 0$
1403.   for each layer $l$ do
1404.     for each node $n$ do
1405.       learn template $\Gamma_n^l$ using Algorithm 1300
1406.       align to parent $\Gamma_n^l = W(\Gamma_n^l; \Gamma_{parent}^{l-1})$
1407.       align data $X_l = W(X_l; \Gamma_n^l) \, \forall \, X_l \in \mathcal{X}_n^l$
1408.     end for
1409.     store $[\Gamma_1^l, \ldots, \Gamma_n^l]$ in $\mathcal{T}$
1410.     compute overall loss with Eq. 4
1411.     terminate when stop criterions satisfed
1412.     for each node $n$ do
1413.       Conduct K-means on $\mathcal{X}_n^l$ with different K
1414.       Select cluster $C_{n,l}$ that maximizes $E$
1415.       partition $\mathcal{X}_n^l$ to child nodes according to $C_{n,l}$
1416.     end for
1417.     store $[C_{1,l}, \ldots, C_{N,l}]$ in $C$
1418.   end for
1419. return $\mathcal{T}, C$
1420. end procedure

FIGURE 14

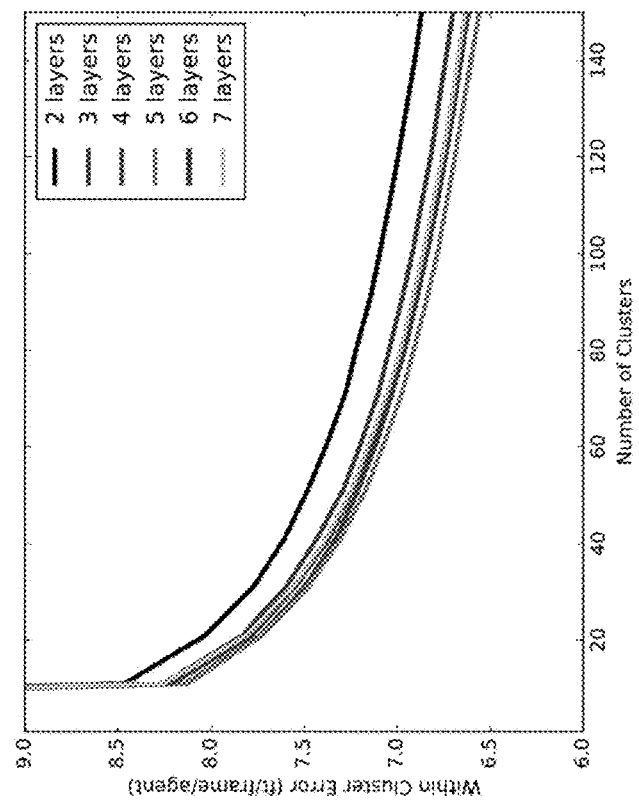
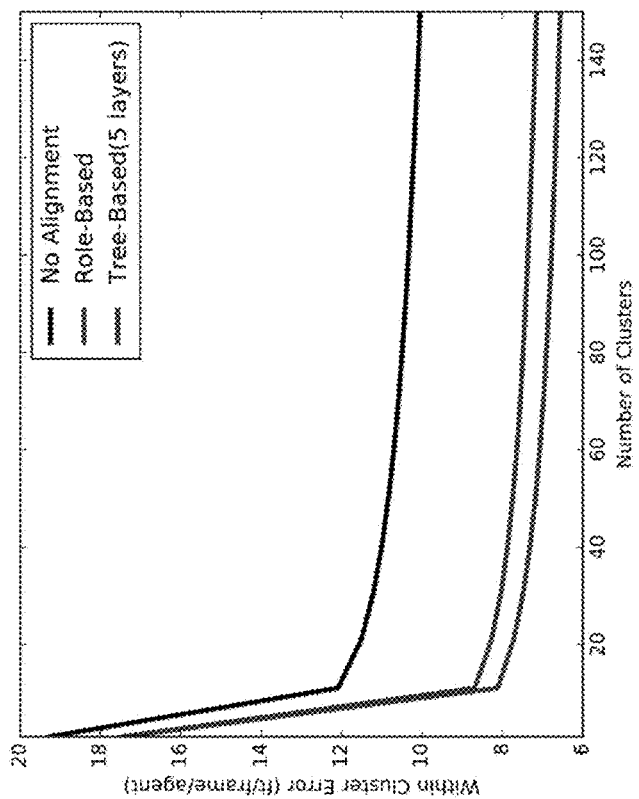
FIGURE 16

SYSTEM AND METHOD FOR PREDICTIVE SPORTS ANALYTICS USING CLUSTERED MULTI-AGENT DATA

CROSS-REFERENCE TO RELATED APPLICATIONS

This patent application is a continuation-in-part of U.S. patent application Ser. No. 15/379,448, filed Dec. 14, 2016, which claims the benefit of U.S. Provisional Patent Application No. 62/266,817 filed Dec. 14, 2015 and U.S. Provisional Patent Application No. 62/351,724, filed Jun. 17, 2016, both of which are incorporated by reference.

BACKGROUND OF THE INVENTION

Recent years have seen the development and deployment of commercial sports tracking systems for tracking the movement of players, balls, or other objects on a sports playing field. These tracking systems vary in their operation, and include purely optically-based systems (e.g., using multiple cameras), radio-based systems (e.g., using RFID tags embedded in player equipment), satellite-based systems (e.g., GPS) and hybrid systems. Generally, regardless of the type of tracking system employed, the output of such a system includes the (x, y) location of players, recorded at a high-frame rate. In this manner, the players' behavior has been essentially "digitized" allowing individual game plays to be visualized via multi-agent trajectories. Although this behavior can be displayed graphically, describing the subtle movement of players via tags or text labels requires an enormous amount of labels and effort (i.e., a picture is worth a thousand words). Moreover, the usefulness of such a system is limited if there is not an ability to store, catalog and retrieve individual game sequences in an efficient manner.

BRIEF SUMMARY OF THE INVENTION

A system is provided for interactive analysis of sports games using gathered trajectory information. The system processes sequences (e.g., "plays") of a game from gathered tracking data in an efficient manner that permits a user to query a database of plays using a graphical representation of the raw trajectories and to interactively find plays that are similar. A user can use selected "exemplar" plays, or user-drawn plays on an interface.

The system also permits interactive statistical analysis by the user based on a graphical representation of the game players and trajectories. For example, the system allows a user to specify a current play-of-interest (such as by selecting the play from a list of exemplar plays, or by manipulating graphical objects on a screen to represent the play) as a query to the database of plays. Using statistical information associated with the plays in the database, the system can present a statistical probability for a particular event occurring in the queried state. With respect to FIG. 9a, a basketball game state is shown with ten players positioned on the court, five on offense and five on defense. The system queries the database using the game situation (or a subset of the elements of the game situation), and displays a statistical probability of a successful outcome for players in that situation (e.g., 34% for Brown), based on similarly situated plays in the database that were retrieved in response to the query. Other types of statistical event probabilities (e.g., pass probability, foul probability, turnover probability, etc.) can also be estimated and presented based on the query.

The system also permits interactive analysis by tweaking or modifying the queried play to ask "what if . . . ?" types of questions. For example, with respect to FIG. 9b, the user has exchanged one player (Brown) for another (Tucker) in the queried situation. The system updates the event probability accordingly, allowing for an efficient statistical comparison of how different players may affect a particular given game situation. Additionally, an embodiment further includes an interface permitting moving the location of one or more players, as shown in FIG. 9d (Gortat being moved to a new location). Again, the statistical probability information is updated based on the modified situation. More generally, the system permits the identification and analysis of plays that may be most effective against a particular opponent.

To achieve these results, an embodiment of the system includes three phases of operation: a) alignment of trajectories using multiple templates; b) discovery of a "playbook" (i.e., hash table) of plays directly from multi-agent trajectory and event data in an unsupervised manner; and c) using the playbook to obtain player and context-specific statistical information in response to input queries. Each of these phases is an improvement over existing systems, such as what is described in U.S. Patent Pub. No. 2016/0260015, to Lucey et al., which is incorporated by reference for all that it teaches. In an embodiment, the present system's use of multiple templates yields significantly improved alignment through "ensemble alignment" or "aligning and clustering." An embodiment also uses both player and ball trajectories, as well as event information, to construct the hash table of plays by using both a decision-tree framework using aligned data as well as a top-down hierarchical model which comprises pruning insignificant or non-predictive trajectories from plays.

An embodiment of the system also makes use of a tree-based representation to align the plays efficiently and group them into appropriate clusters. This allows the system to more accurately predict outcomes for a given play. For example, given data regarding player positioning on a basketball court over a 4-second interval, the system makes use of the improved alignment and clustering to predict the trajectory of the ball with greater accuracy than has been previously available. The tree-based representation further permits efficient processing of data in order to generate predictions, such as reducing the time needed to train a neural network by an order of magnitude over previous systems.

Although the examples described herein relate specifically to the sports of basketball and soccer, the system is not limited to any particular sport, and can be applied to any sport or domain with fine-grain trajectory data (whether it be from optical tracking data (e.g., SportVU) or wearable devices (e.g., RFID, GPS) or any other type of input (e.g., hand-drawn, annotated)).

BRIEF DESCRIPTION OF THE DRAWINGS

FIG. 5 is a flow diagram illustrating a top down method of learning a decision-tree for sports plays, in accordance with an embodiment of the present system;

FIGS. 6a-6d illustrate an application of a top down method of learning a decision-tree for sports plays, in accordance with an embodiment of the present system;

FIG. 13 is a diagram illustrating an algorithm for learning a template by aligning a class of sports plays, in accordance with an embodiment of the present system;

FIG. 14 is a diagram illustrating an algorithm for learning a collection of sports plays as a tree, in accordance with an embodiment of the present system;

FIG. 16 is a diagram illustrating empirical results for different alignment processes, in accordance with an embodiment of the present system;

DETAILED DESCRIPTION OF THE INVENTION

Embodiments of the present system process large amounts of sports-related tracking data in an efficient manner, enabling the querying and retrieval of statistically similar sports plays and the generation of analytical statistical predictions for player and team behavior through an interactive visual interface.

Figure 1:
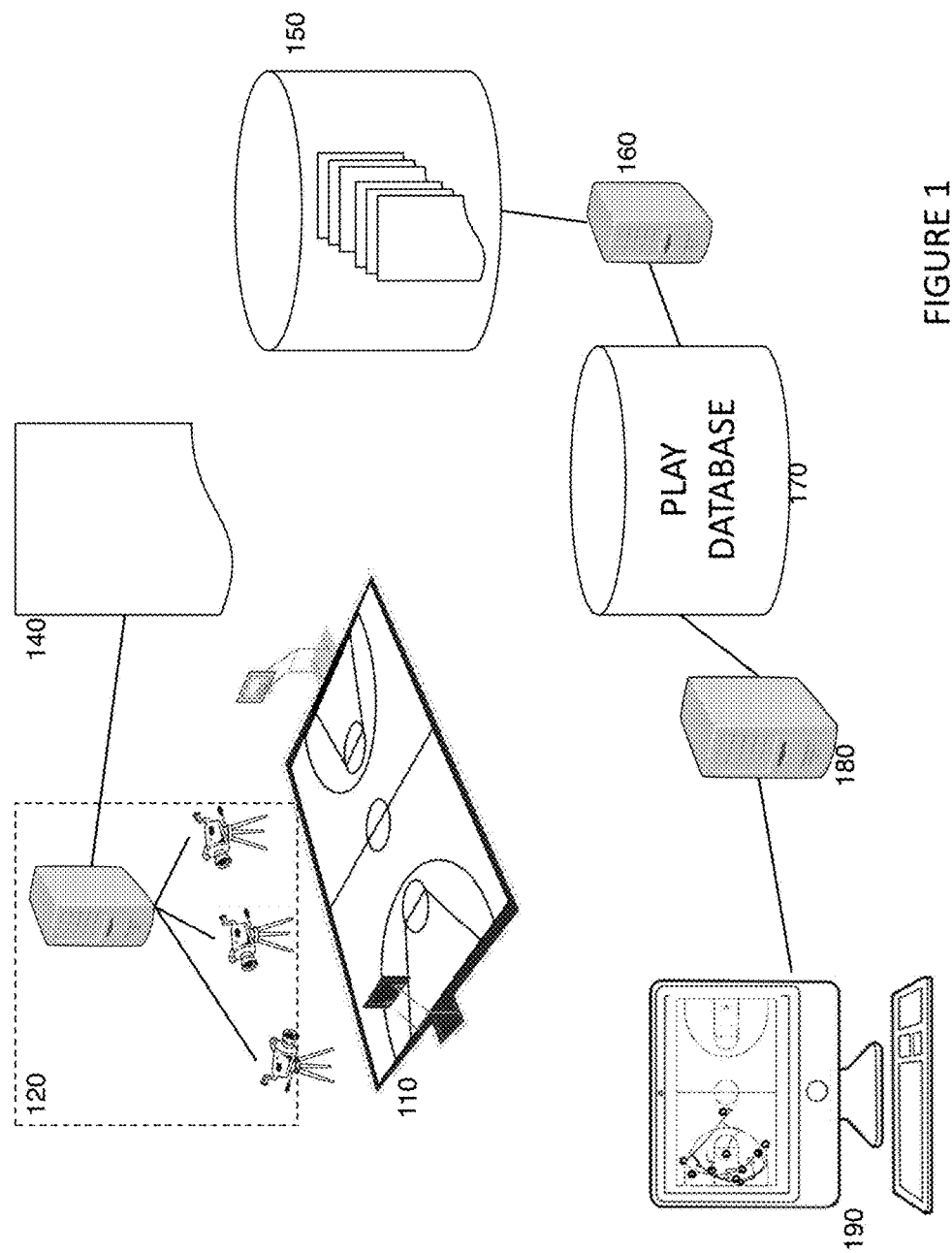
FIG. 1 illustrates an architectural environment for a system for interactive sports analytics, according to an embodiment of the present system.

A general overview of the context of the system is described with respect to FIG. 1, in accordance with an embodiment. At a sporting event taking place at a venue 110, a tracking system 120 records the motions of all players on the playing surface, as well as any other objects of relevance (e.g., the ball, the referees, etc.). Tracking system 120 can be an optically-based system using, for example, a plurality of fixed cameras. Alternatively, tracking system 120 can be a radio-based system using, for example, RFID tags worn by players or embedded in objects to be tracked, or tracking system 120 can be another type of system that tracks moving objects. Preferably, tracking system 120 samples and records at a high frame rate (e.g., 25 frames per second) so as to minimize quantization, enabling expert humans to select the onset and offset of plays at precise times (i.e., frame-level), as well as particular players of interest. Tracking system 120 stores at least player identity and positional information (e.g., (x,y) position) for all players and objects on the playing surface for each frame in a game file 140. The game file 140 is preferably augmented with other event information corresponding to the frames, such as game event information (pass, made shot, turnover, etc.) and context information (current score, time remaining, etc.), and assembled into data store 150 comprising a large number of game files for the given sport (e.g., an entire season of the National Basketball Association games).

A preprocessing engine 160 processes the raw data from the data store 150 through multiple-template alignment and discriminative clustering, in accordance with embodiments described herein, and stores the results in a play database 170. A play database server 180 processes queries to the play database 160. A computing device 190 runs an interactive sports analytics interface and is communicatively connected to the play database server 180. Using the interactive sports analytics interface, a user can submit graphical representations of plays as queries to the play database server 180 and obtain results from the play database 170 that are situationally similar to the queried play, along with statistical information. The user can tweak or modify the query and obtain updated statistical results.

Figure 2:
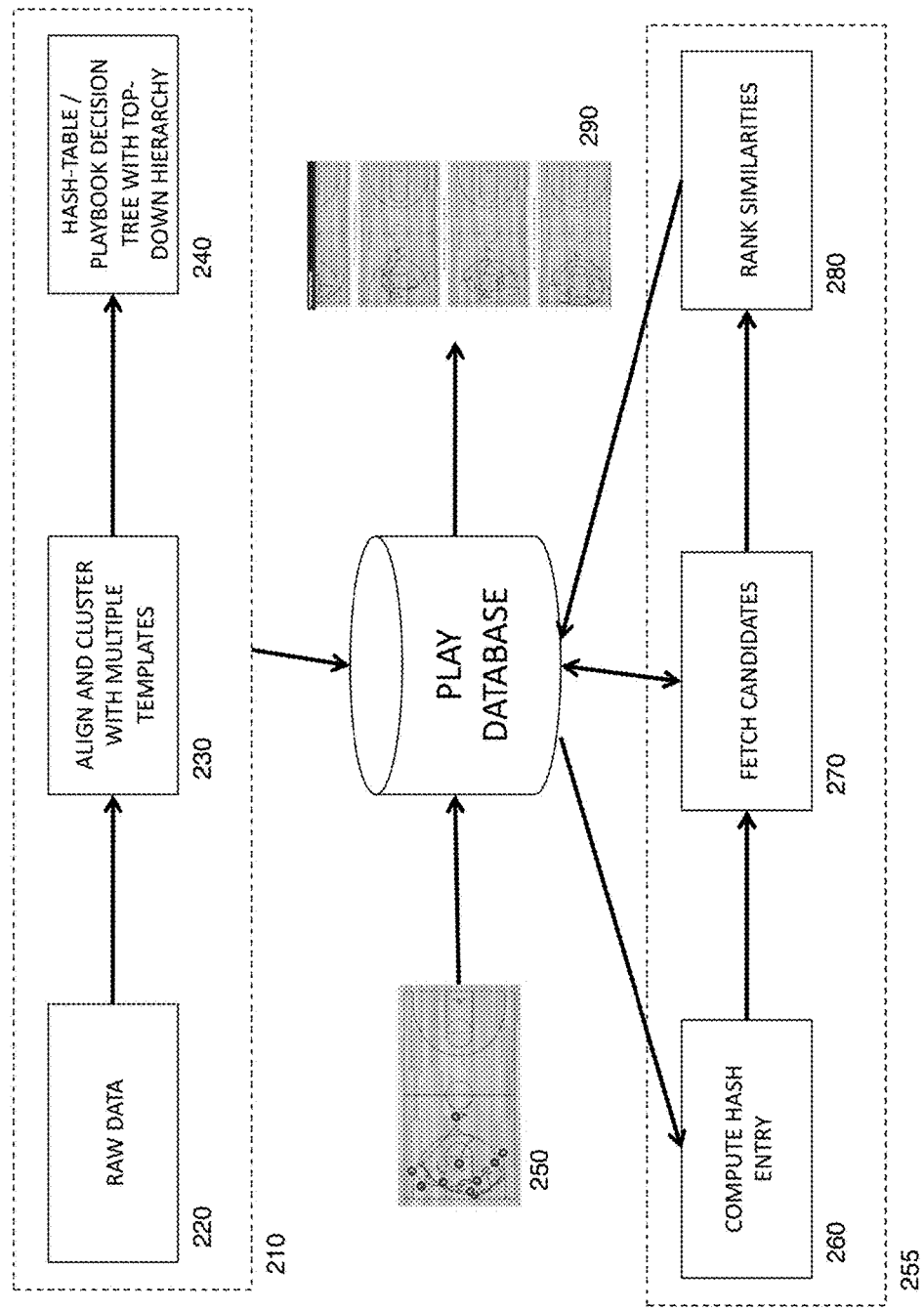
FIG. 2 is a diagram illustrating a general method for performing interactive sports analytics, according to an embodiment of the present system.

Turning to FIG. 2, the general process of pre-processing and retrieving plays from a play database is shown, in accordance with an embodiment. In a pre-processing phase 210, the raw positional data 220 is aligned and clustered using multiple templates at a step 230. At a pre-processing step 240, the multiply-aligned plays are discriminatively clustered using a top-down hierarchical approach to form a hash table/decision tree that acts as a playbook, cataloging the plays for efficient retrieval by similarity and various classification metrics. Once the database has been pre-processed, an input query 250 to the database, consisting of a graphical representation of a play and other possible constraints or metrics, can be processed during a retrieval phase 255. The retrieval process begins by computing a hash value for the play at a step 260, and navigating the hash table/decision tree to fetch similar candidates at step 270. The candidates are ranked at step 280 and the top candidates are returned as the result at step 290.

Figure 3:
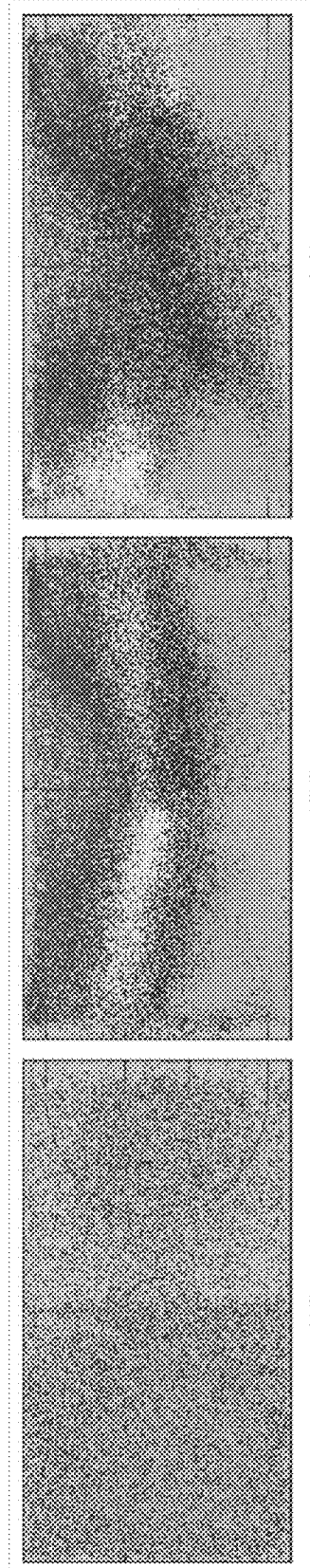
FIG. 3 is a graphic diagram illustrating the use of alignment of positional sports player data, in accordance with an embodiment of the present system.

In an embodiment, the alignment of plays is performed using multiple templates. An example of misalignment of tracking data is illustrated in FIG. 3. FIG. 3a indicates the locations of five basketball player positions in one quarter of a game. There is little distinctiveness to any of the players, particularly on the offensive end of the court. FIG. 3b illustrates player positions after aligning the plays based on their role (point guard, shooting guard, center, etc.) However, because the plays have been aligned to only single template, there is little variation shown between offensive and defensive positioning for each player role. FIG. 3c illustrates player positions after aligning plays with multiple-templates using a tree-based representation in accordance with an embodiment of the present system, showing greater definition and distinctiveness between a player's positioning on offense (left half) and defense (right half).

In an embodiment, the present system performs alignment using multiple templates. Given M agents (players, ball, and/or other objects to be tracked), and their two-dimensional continuous raw positions, the dataset of multi-agent behavior D consisting of length F frames is represented as a concatenated sequence of (x, y) points:

$$D_{F \times M} = \begin{bmatrix} x_1^1 & \cdots & x_M^1 \\ \vdots & \ddots & \vdots \\ x_1^F & \cdots & x_M^F \end{bmatrix}$$

where $x_j^i = [x_j^i, y_j^i]$ denotes the two-dimensional coordinates of the $j^{th}$ agent at the $i^{th}$ time instance and $X_j$ is the representation of all M agents for the $j^{th}$ frame.

Spatial alignment is performed by finding a set of permutation matrices with the objective of maximizing the similarity of the data. That is, a set of M permutation matrices, $\Phi = \{P_1, \ldots, P_M\}$ is constructed such that the total similarity is maximized (or the total entropy is minimized). Given that the similarity between two frames of data can be measured as the negative Euclidean distance $-\|X_i - X_k\|_2$, the objective is to maximize the following $$\operatorname{argmax}_{\Phi} \sum_{i=1}^{F} \sum_{k=1}^{F} -\|\Phi_i(P)X_i - \Phi_k(P)X_k\|_2$$

The multiple template approach of the present system improves the alignment, maximizing the similarity of the data (or minimizing the reconstruction error when using the learned templates). In addition, the benefit of discovering multiple templates permits higher-level features or latent factors that can be used to personalize queries by matching specific contexts and conditions.

Figure 4:
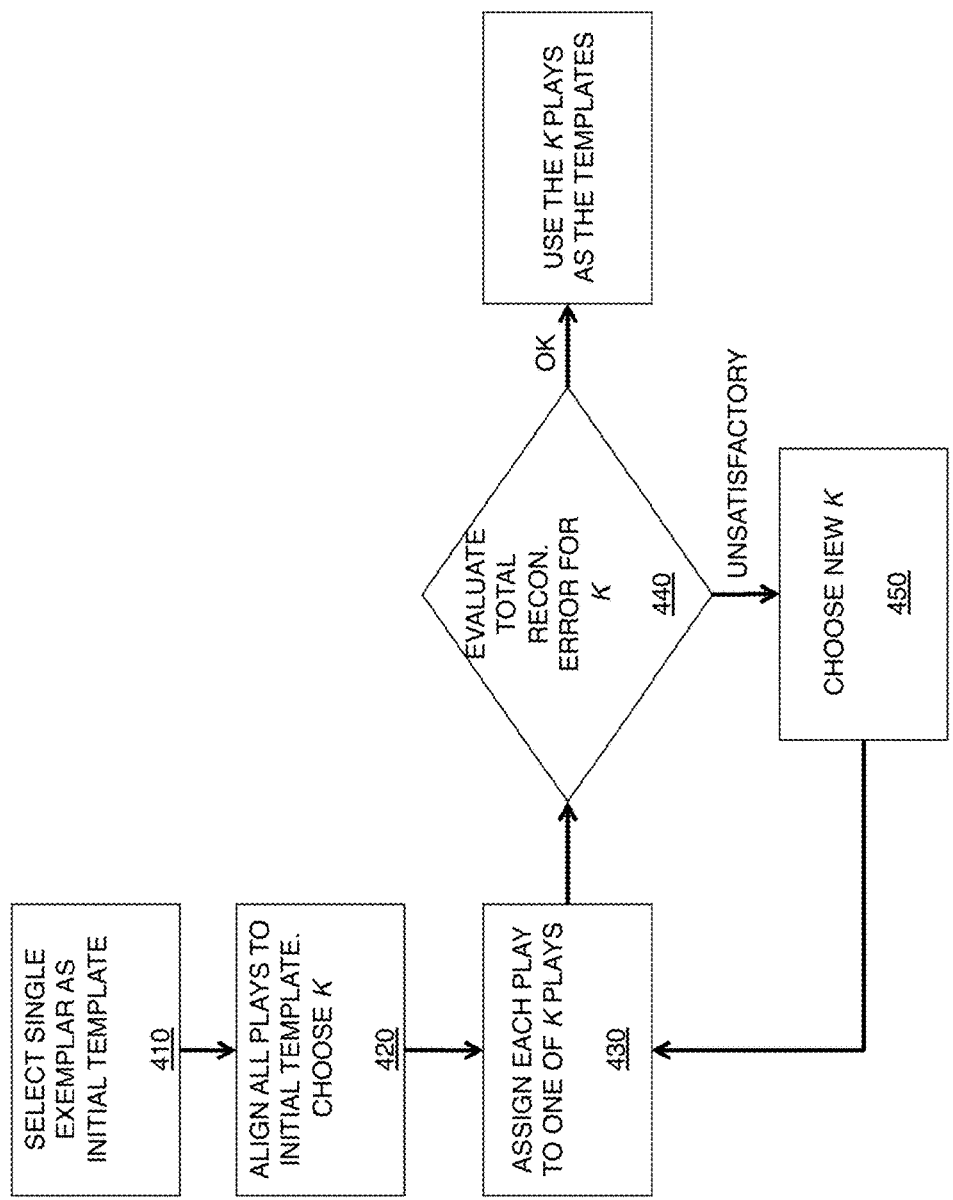
FIG. 4 is a flow diagram illustrating a method of aligning sports plays using multiple templates, in accordance with an embodiment of the present system.
Figure 6B:
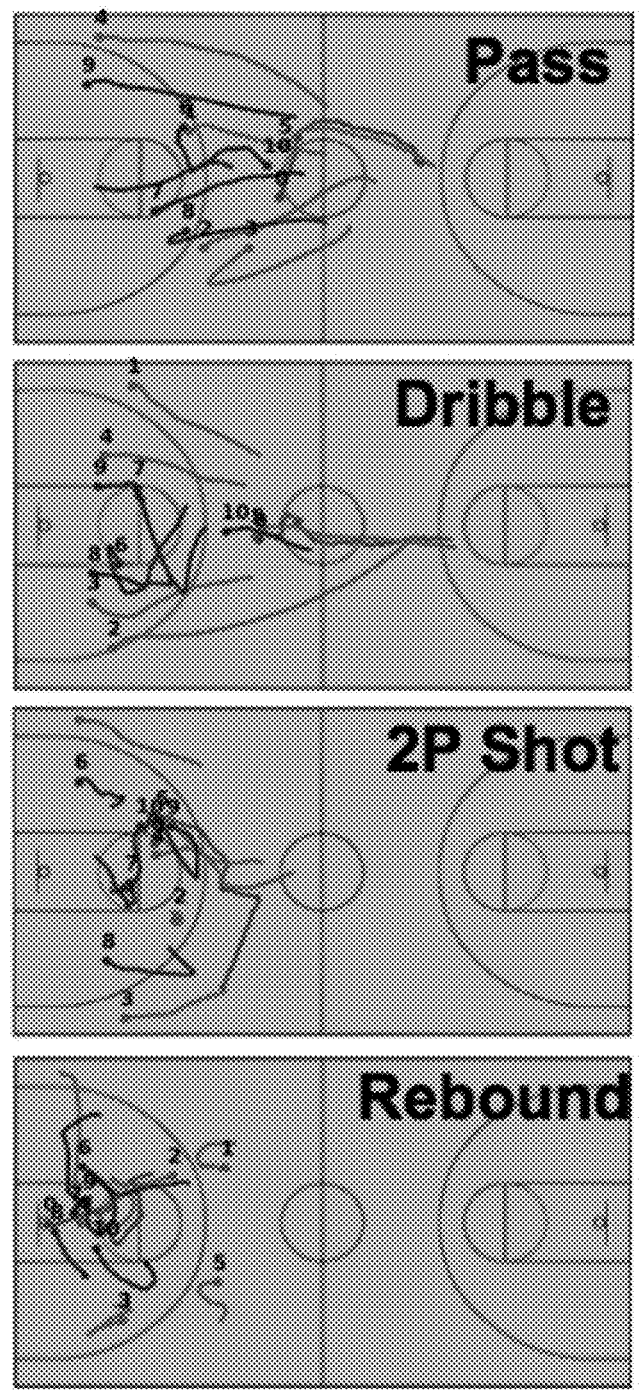
Figure 6D:
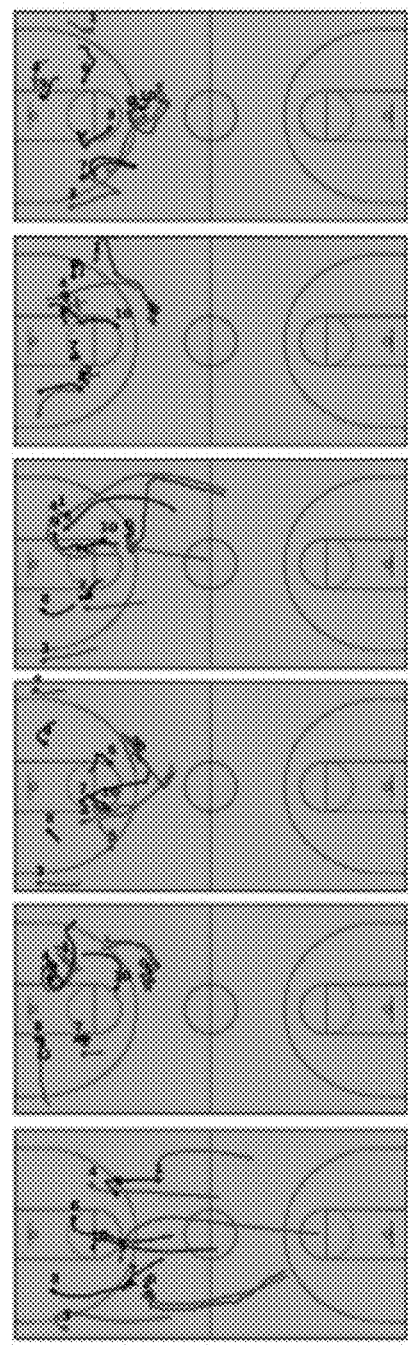

Turning to FIG. 4, a method is described of finding multiple templates directly from raw trajectory data, in accordance with an embodiment. At step 410, a single exemplar play of interest is selected as the initial template. The initial template can be a random sample, or found using previous single template methods, such as those described in Lucey et al., "Representing and Discovering Adversarial Team Behaviors using Player Roles," Computer Vision and Pattern Recognition (2013), which is incorporated by reference for all that it teaches.

At step 420, all plays in the database are aligned to the initial template by calculating the cost matrix, which consists of finding the distance (such as L2 distance) between each trajectory in the template and each trajectory in the candidate play. The permutation matrix is calculated using known techniques (for example, the Hungarian algorithm, as described in Harold W Kuhn, "The Hungarian method for the assignment problem," Naval research logistics quarterly 2, 1-2 (1955), 83-97, which is incorporated by reference for all that it teaches), and the candidate play is accordingly permuted to align it to the template.

At step 430, a value of K is chosen and a clustering algorithm (e.g., K-means, agglomerative clustering, affinity propagation) is used to assign each play of the database to one of K plays. The total reconstruction error is measured for the K clusters.

At step 440, the total reconstruction error for K is compared to a desired threshold value. If the total reconstruction error for K is less than the threshold, the K plays are used as the multiple templates, and the process terminates. Otherwise, at step 450, a new value for K is chosen, and the clustering algorithm is run again at step 430. Alternatively, a different threshold function is used, such as if K exceeds some number. Alternatively, the total reconstruction error for each iteration is compared, and the value of K yielding the minimal reconstruction error after some time period or number of iterations is selected.

Another alternative, as used in an embodiment, is a matching-pursuit type approach to find a suitable set of K templates. Beginning with K=1, the exemplar which can best represent the data is found. This exemplar is added it to the dictionary of exemplars, and K is incremented to K=2 to find the next best exemplar to represent the data. This process continues until some desired criterion is met.

The method of finding multiple templates described above with respect to FIG. 4 has advantages over methods, such as hand-crafting features by an expert which encodes and discriminates the semantics of the behavior of interest (for example, if an expert were to code a "pick-and-roll" play in basketball). The expert-selection method is problematic as it is lossy (it only selects a few agents of interest), and creates an over-complete feature representation which would need to be reduced. In contrast, the method of FIG. 4 corresponds to merely an added column in the database which corresponds to the best permutation, making clustering, retrieving and short-term prediction easy and interpretable.

Hash-Table/Playbook Learning

For retrieval tasks using large amounts of data, an embodiment of the system uses a hash-table is required by grouping similar plays together, such that when a query is made, only the "most-likely" candidates are retrieved. Comparisons can then be made locally amongst the candidates and each play in these groups are ranked in order of most similar. Previous systems attempted clustering plays into similar groups by using only one attribute, such as the trajectory of the ball. However, the semantics of a play are more accurately captured by using additional information, such as information about the players (e.g., identity, trajectory, etc.) and events (pass, dribble, shot, etc.), as well as contextual information (e.g., if team is winning or losing, how much time remaining, etc.). Thus, embodiments of the present system utilize information regarding the trajectories of the ball and the players, as well as game events and contexts, to create a hash-table, effectively learning a "playbook" of representative plays for a team or player's behavior. The playbook is learned by choosing a classification metric that is indicative of interesting or discriminative plays. Suitable classification metrics may include predicting the probability of scoring in soccer or basketball (e.g., expected point value ("EPV"), or expected goal value ("EGV"), as described in Miller et al. ("Factorized Point Process Intensities: A Spatial Analysis of Professional Basketball," in ICML, 2014) and Lucey, et al. ("Quality vs quantity": Improved shot prediction in soccer using strategic features from spatiotemporal data," in MIT Sloan Sports Analytics Conference, 2015), which are hereby incorporated by reference for all that they teach. Other predicted values can also be chosen for performance variables, such as probability of making a pass, probability of shooting, probability of moving in a certain direction/trajectory, or the probability of fatigue/injury of a player.

The classification metric is used to learn a decision-tree, which is a coarse-to-fine hierarchical method, where at each node a question is posed which splits the data into groups. A benefit of this approach is that it can be interpretable and is multi-layered, which can act as "latent factors."

Bottom-Up Approach

In an embodiment of the system, a bottom-up approach to learning the decision tree is used. Various features are used in succession to discriminate between plays (e.g., first use the ball, then the player who is closest to the ball, then the defender etc.). By aligning the trajectories, there is a point of reference for trajectories relative to their current position. This permits more specific questions while remaining general (e.g., if a player is in the role of "point guard", what is the distance from his/her teammate in the role of "shooting guard", as well as the distance from the defender in the role of "point guard"). Using this approach avoids the need to exhaustively check all distances, which is enormous for both basketball and soccer.

Top-Down Approach

In another embodiment of the system, a top-down approach to learning the decision tree is used. An example of the top-down approach is described with respect to FIG. 5. At step 510, all the plays are aligned to the set of templates. From this initial set of templates, at step 520 the plays are assigned to a set of K groups (clusters), using all ball and player information, forming Layer 1 of the decision tree. Back propagation is then used at step 530 to prune out unimportant players and divide each cluster into sub-clusters (Layer 2). The approach continues at step 540 until the leaves of the tree represent a dictionary of plays which are predictive of a particular task—i.e., goal-scoring (Layer 3).

An example of applying the top-down approach is shown in FIGS. 6a-6d. Beginning with one exemplar template (Layer 1), all basketball plays are first aligned to the exemplar and clustered into K groups using all player and ball information, shown in Layer 2. Back-propogation is then used to prune out unimportant players and then to divide each cluster into sub-clusters, shown in Layer 3. This approach is continued until there is a "dictionary" of plays which are sufficiently predictive of a particular task, such as field goal-scoring, shown in Layer 4.

Personalization Using Latent Factor Models

In addition to raw trajectory information, in embodiments of the system, the plays in the database are also associated with game event information and context information. The game events and contexts in the database for a play may be inferred directly from the raw positional tracking data (e.g., a made or missed basket), or may be manually entered. Role information for players (e.g., point guard, shooting guard, center) can also be either inferred from the positional tracking data or entered separately. In embodiments of the system, a model for the database can then be trained by crafting features which encode game specific information based on the positional and game data (e.g., distance from basket/goal, distance from defenders, particular events, etc.), and then calculating a prediction value (between 0 and 1) with respect to a classification metric (e.g., expected point value).

If there are a sufficient number of examples, the database model can be personalized for a particular player or game situation using those examples. In practice, however, a specific player or game situation may not be adequately represented by plays in the database. Thus, embodiments of the system find examples which are similar to the situation of interest—whether that be finding players who have similar characteristics or teams who play in a similar manner. A more general representation of a player and/or team is used, whereby instead of using the explicit team identity (i.e., James as a player, or Manchester United as a team), each player or team is represented as a distribution of specific attributes, in a manner such as described by Yue, et al. ("Learning Fine-Grained Spatial Models for Dynamic Sports Play Prediction," in ICDM, 2014), Miller et al. ("Factorized Point Process Intensities: A Spatial Analysis of Professional Basketball," in ICML, 2014) and Wei et al. ("Predicting serves in tennis using style priors," in KDD, 2015), which are hereby incorporated by reference.

Figure 7:
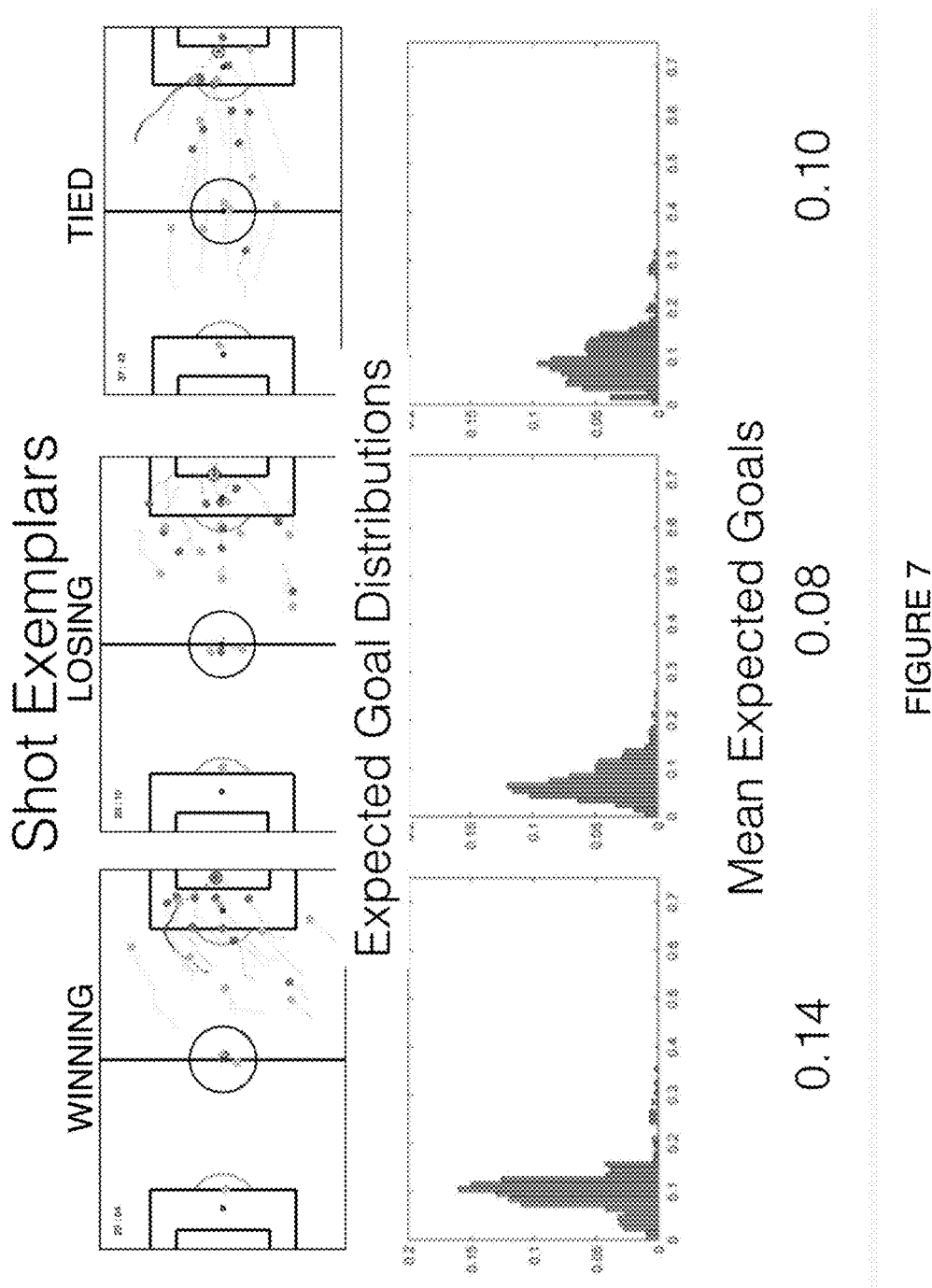
FIG. 7 is a diagram illustrating an example application of an interactive sports analytics system, in accordance with an embodiment of the present system.

Embodiments of the system use the plays in the hash-table/playbook that were learned through the distributive clustering processes described above. As an example, FIG. 7 shows the results of one implementation where the game-context for a particular soccer team has been used with a database of soccer plays in accordance with an embodiment. In the example of FIG. 7, the database of plays was aligned to multiple templates and distributively clustered on criteria including game-context (i.e., whether the team was winning, losing, or tied). Using the classifying metric of expected goal value, different goal scoring plays are retrieved from the database depending on the game-context. That is, when winning, the most likely shooting method is a counter-attack. When losing, the most likely shooting method is on a slower attack. The mean EGV for these situations is shown to be 14% when winning, 8% when losing, and 10% when tied. This information is useful for determining a team's strategy, and also allows performing more accurate match prediction generally by modeling a team's behavior for different match context depending on the strength/weaknesses of their attributes.

Figure 8:
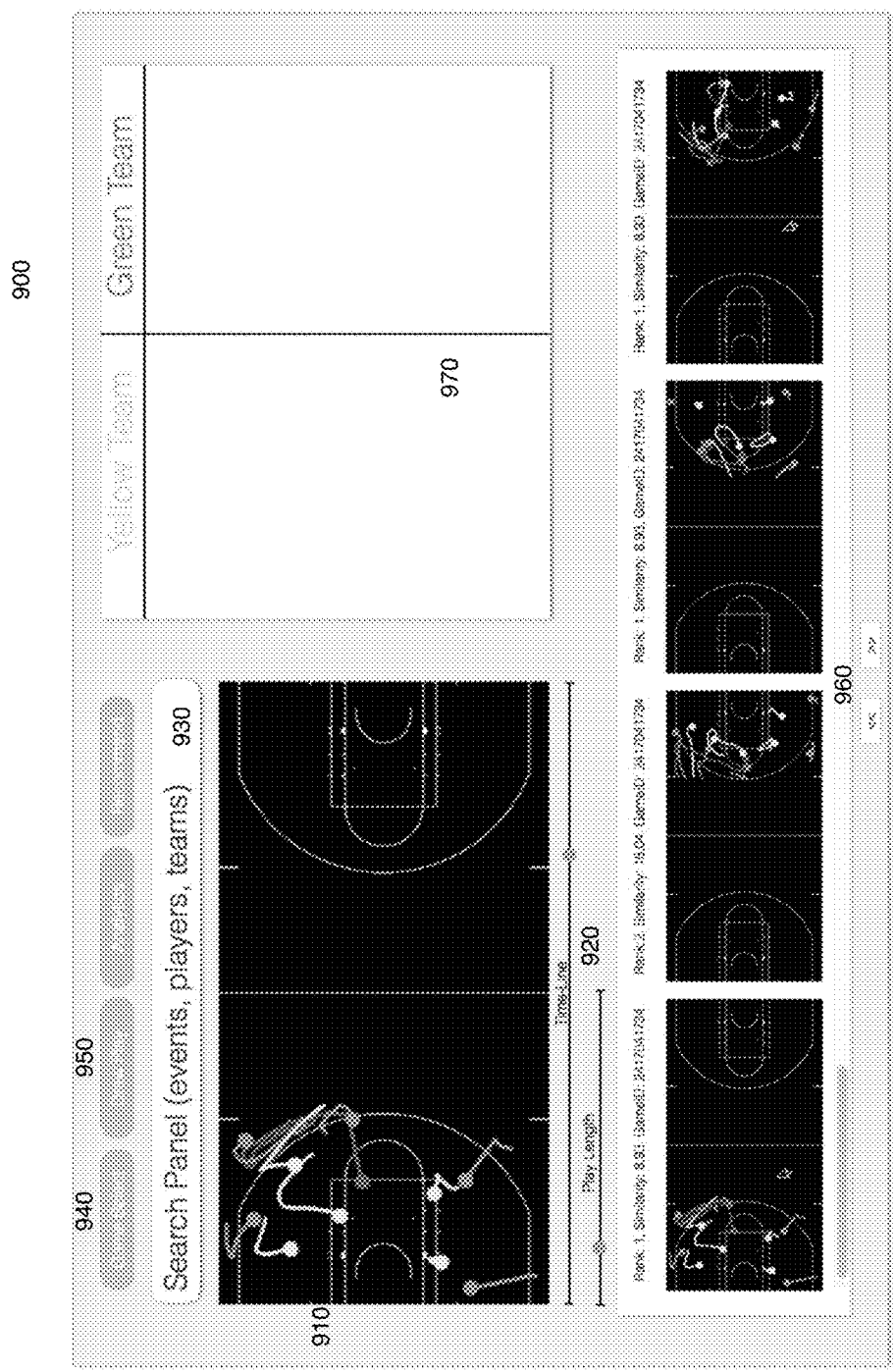
FIG. 8 is an illustration of an interactive sports analytics interface, in accordance with an embodiment of the present system.

Turning to FIG. 8, an example user interface 900 is shown for use in accordance with embodiments of the system to perform interactive analytics for a basketball game. A first interactive panel 910 displays the current play at issue, including graphical depictions of the players (circles) and their recent trajectories (tails), as well as the ball. Sliders 920 permit the user to select the play length window to be analyzed, and to see a timeline for the entire length of the play. The play is initially either loaded from the database (for example, as a result of a user search through a search panel 930 and/or a Game Select button 940), or drawn by the user using a touchscreen, stylus, keyboard or other input device (for example, after a user's selection of a Draw Play option 950). Once entered or selected, the interface uses this play as an input query to the database and retrieves similar plays to display in a retrieved play panel 960. In an embodiment, an additional panel on the interface is used to display actual video footage from the archived game, corresponding to a user's selection of one of the retrieved plays, synchronized to the graphical depiction. An additional player selection panel 970 is presented to allow the user to assign or manipulate team players to the graphical depictions in the first interactive panel 910.

Figure 9A:
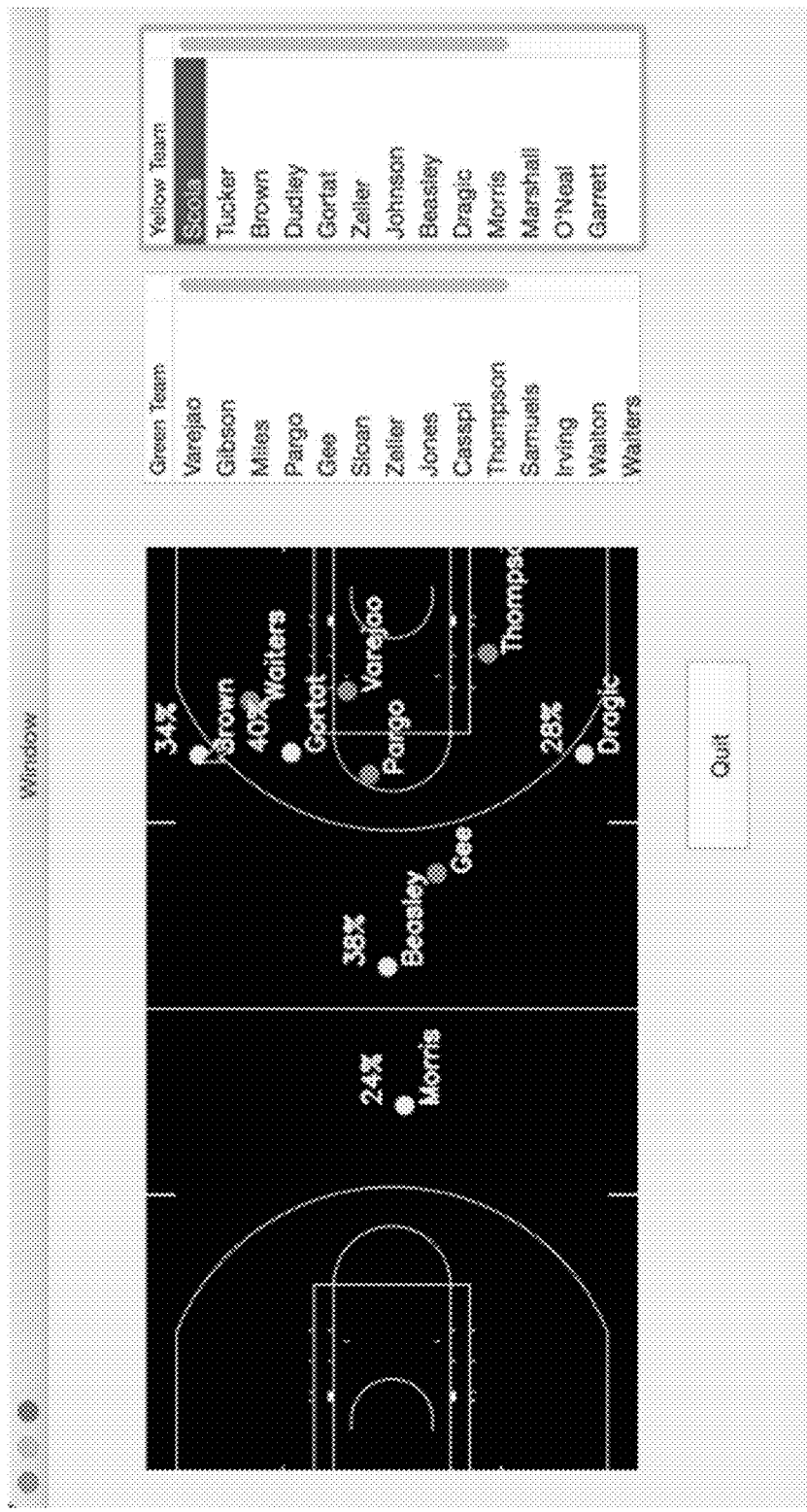
FIGS. 9a-9d are illustrations of an interactive sports analytics interface, in accordance with an embodiment of the present system.
Figure 9B:
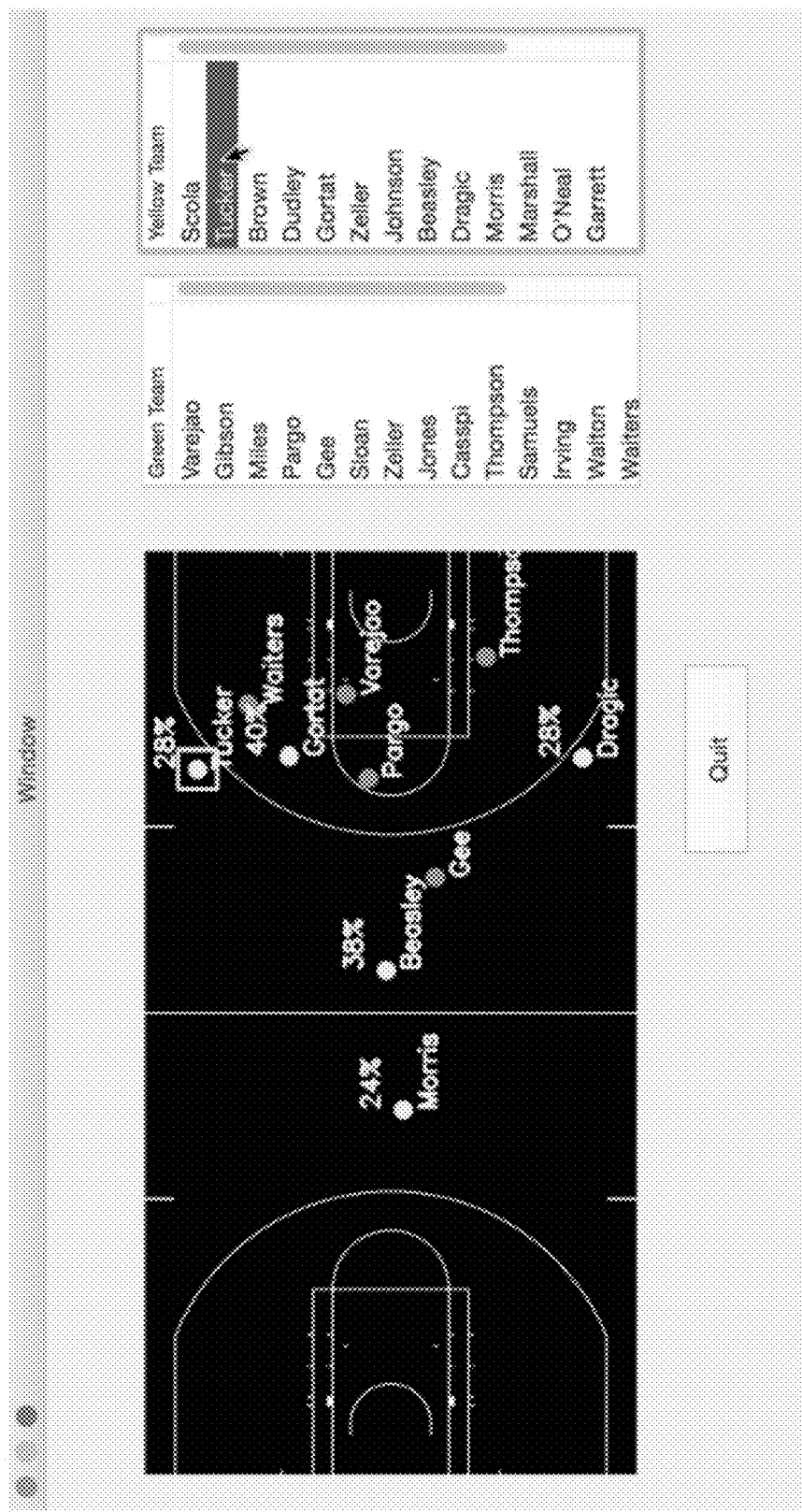
Figure 9C:
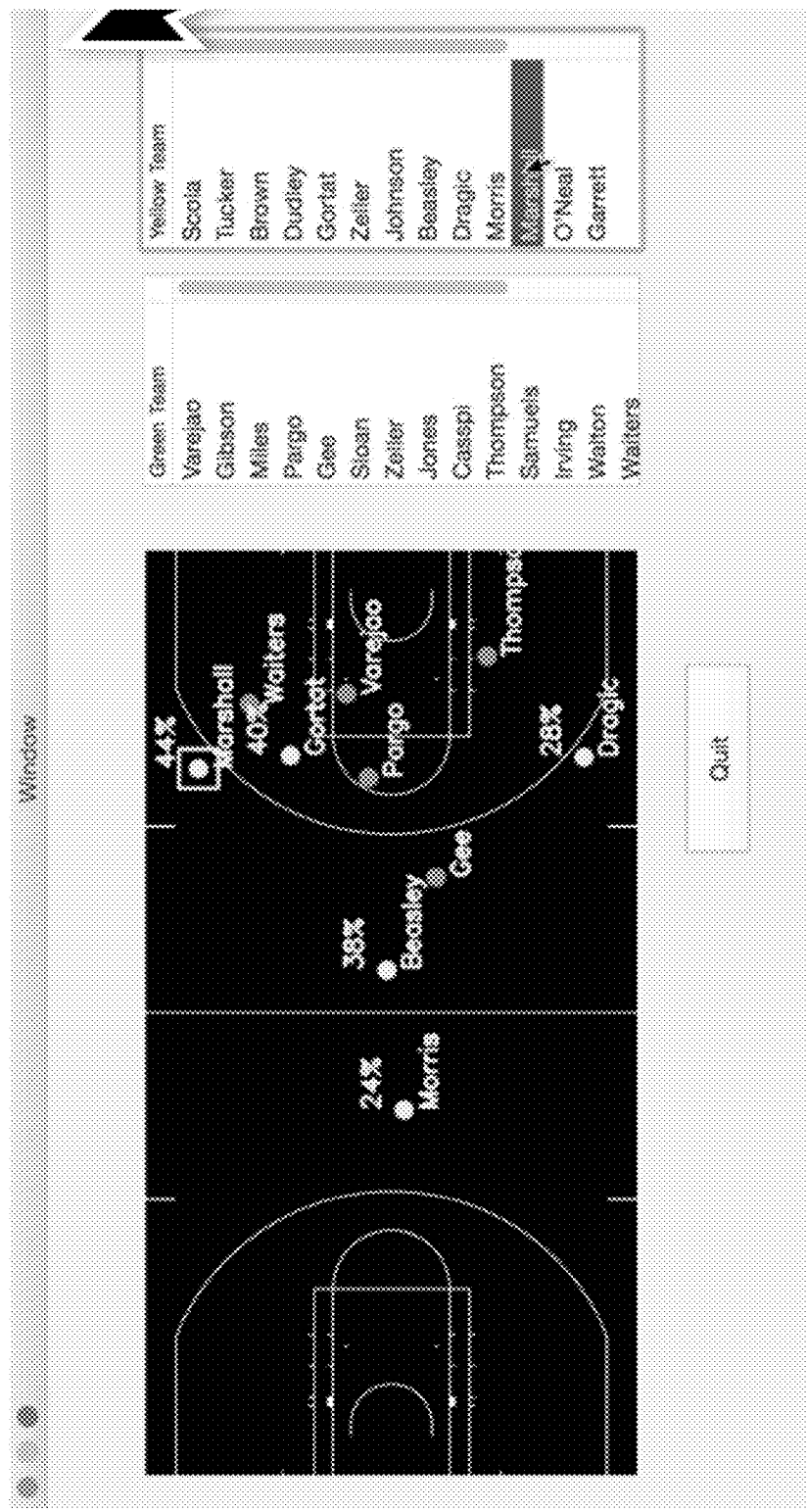
Figure 9D:
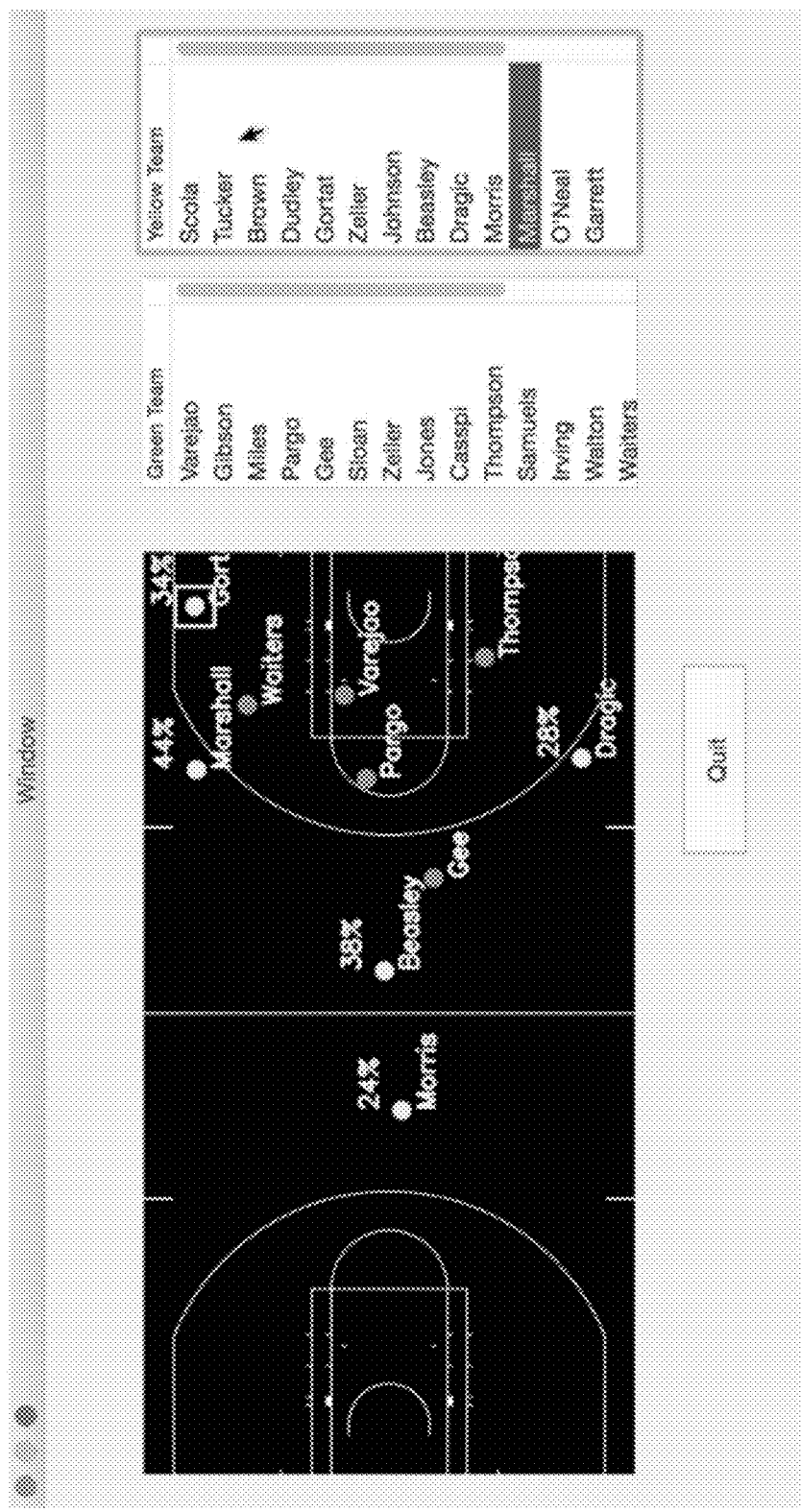

Turning to FIG. 9a, another example user interface is shown for use in interactive analysis of a basketball game, in accordance with an embodiment. In this example, the positions of the ten players are shown graphically, and identified by the players' names. Additionally, the offensive team players display the EPV given the current game configuration. Using the interactive panel, the user in this example has selected one player, "Brown," whose EPV in the situation is 0.34. In FIG. 9b, the user selects one of the players, "Tucker", from a player selection panel, causing the interactive display panel to update using statistical information retrieved for similar plays from the database. In particular, the system updates the EPV for Tucker, to 0.28, indicating that Tucker is not expected to perform as well offensively in this situation as compared to Brown. In FIG. 9c, the user has swapped Tucker with "Marshall" using the player selection panel, and Marshall's updated EPV of 0.44 is presented, based on the statistical information retrieved for similar plays from the database. Turning to FIG. 9d, using the interface, the user has moved the position of the graphical depiction of one player, "Gortat," and the player's corresponding EPV is updated by the system from 0.40 to 0.34, indicating that Gortat is less likely to be offensively productive in this proposed position. Alternatively, in addition to swapping a player, embodiments of the system calculate statistical values based on the swapping of the team surrounding the player. For example, if the same player now plays for a different team, the system can calculate the change in the player's likelihood of being offensively productive with different teammates in the same situation.

Figure 10A:
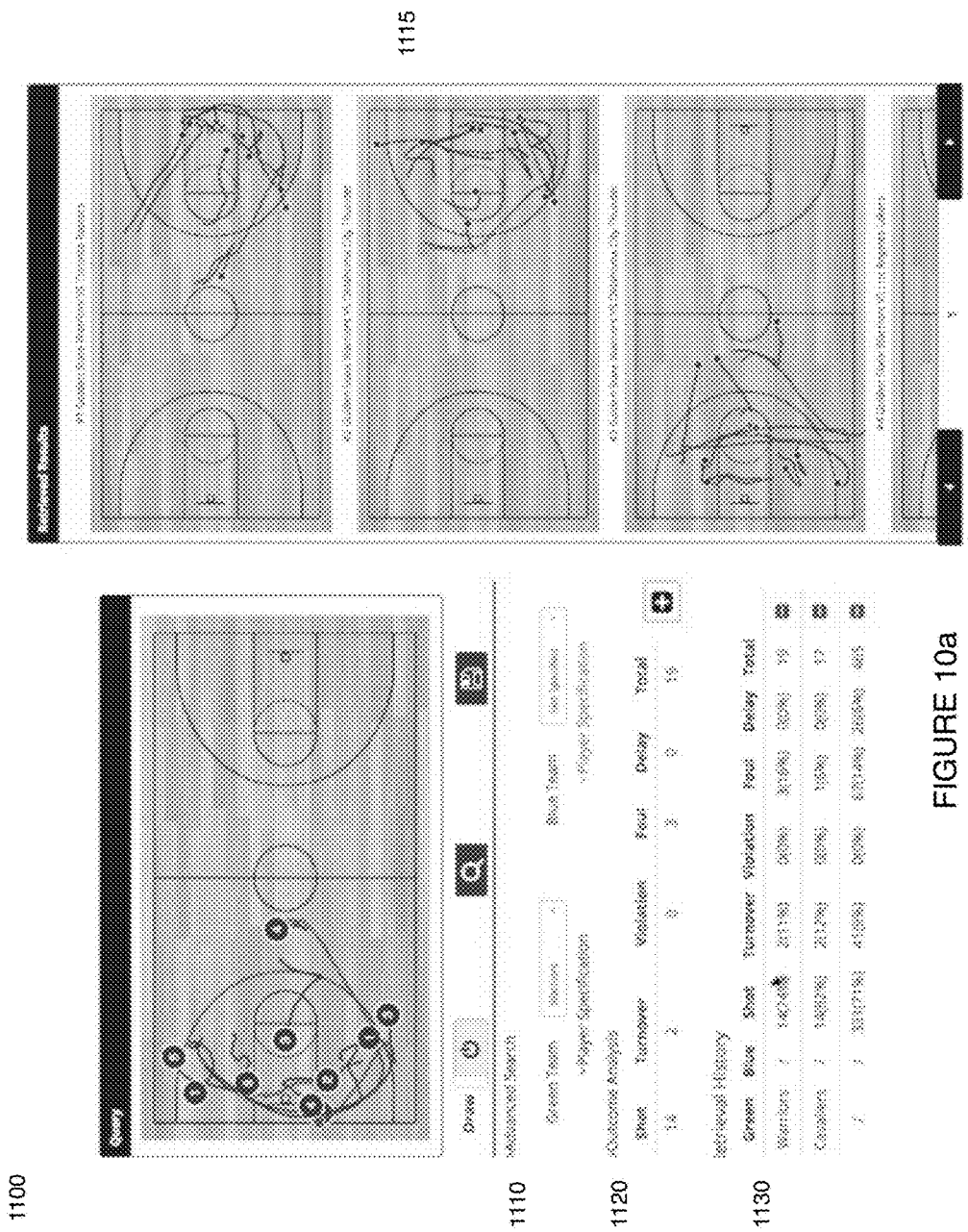
FIGS. 10a-10b are illustrations of an interactive sports analytics interface, in accordance with an embodiment of the present system.

Turning to FIG. 10a, another example user interface 1100 is shown of use in interactive analysis of a basketball game, in accordance with an embodiment. A set of advanced searching options 1110 are presented, allowing the user to restrict the database search to particular subsets of plays. In this example, the user has restricted the "Green Team" (on offense here) to be the Warriors, while the "Blue Team" (on defense here) is unrestricted. Other restrictions might be based on the game context (e.g., less than 2 minutes left in game, first 5 minutes of game, time of day (day game vs. night game), particular player on the court, etc.). The retrieved similar plays 1115 from the database query are displayed on the right. An Outcome Analysis section 1120 for the query displays statistical results for the retrieved plays, i.e., out of 19 results, 14 led to a shot, 2 to a turnover, and 3 to a foul. A Retrieval History section 1130 of the display indicates the statistical results from past queries of the situation. In this example, a previous result for limiting the query to the Cavaliers is shown (17 results), along with an unrestricted query of all similar plays (465 results).

Figure 10B:
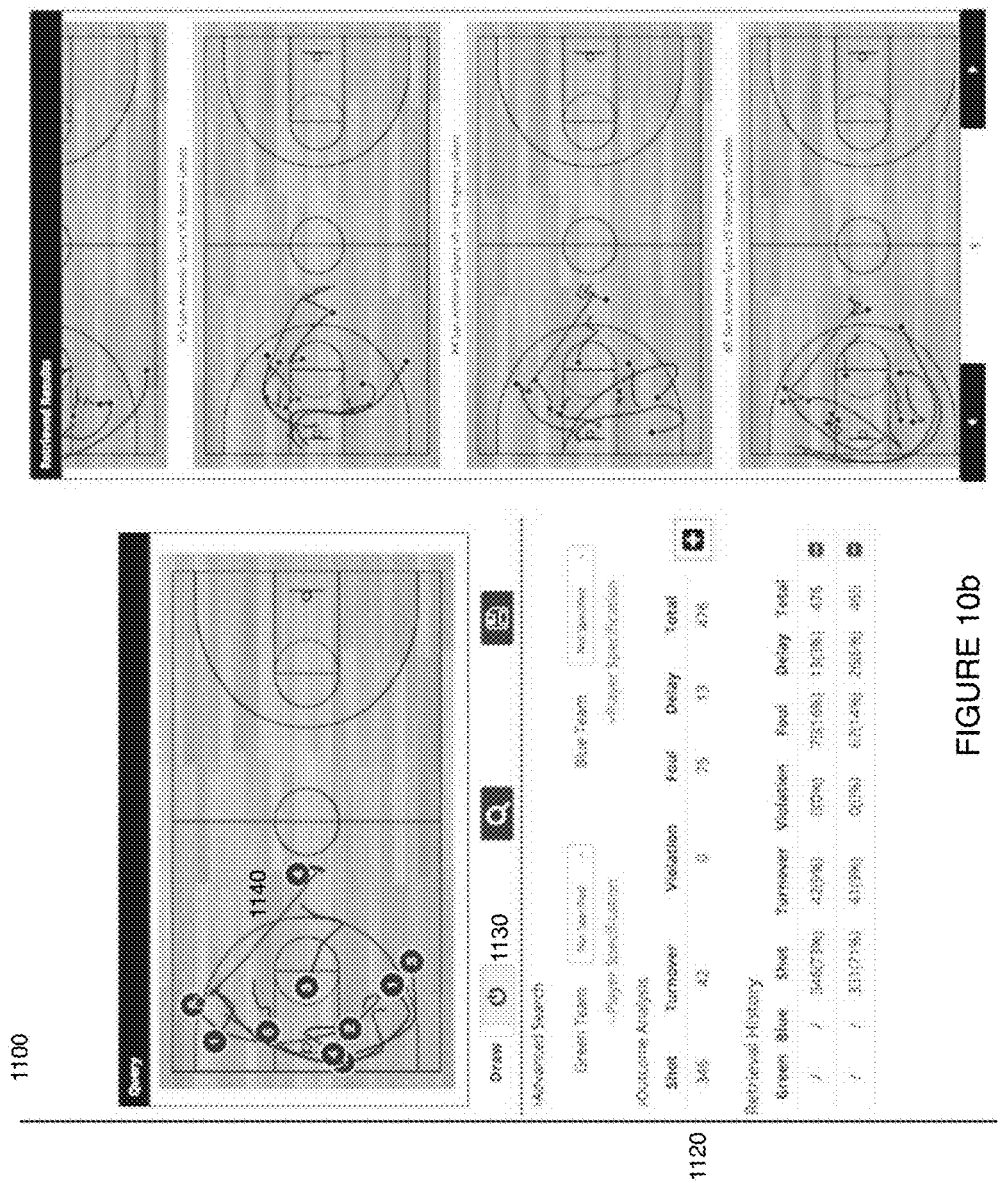

In FIG. 10b, the user has used the interface 1100 to manipulate the trajectory of the ball 1140 using a Draw option 1150. Whereas the original play had indicated a pass from Green Player 4 to Player 3 to Player 2, the new proposed play indicates a pass from Green Player 4 to Player 5. The interface queries the database accordingly to retrieve similar plays 1160, displayed on the right. Again, the Outcome Analysis section 1120 is updated according to query results and can be compared to the Retrieval History section 1130, indicating that the proposed play increases the likelihood of taking a shot (from 71% to 73%) and the likelihood of being fouled (from 14% to 16%).

Role-Based Alignment

Figure 11:
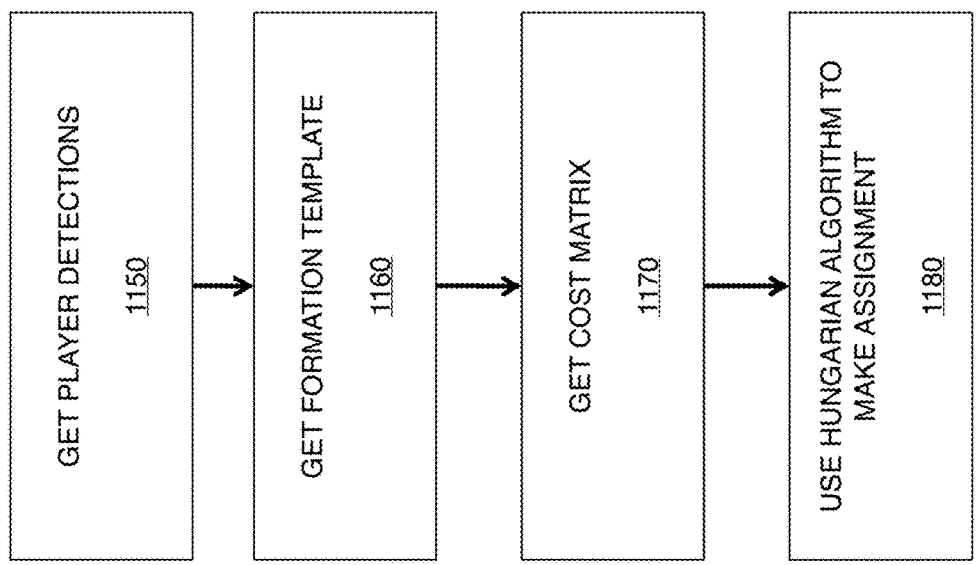
FIG. 11 is a flow diagram illustrating a method of aligning sports plays using a role-based process, in accordance with an embodiment of the present system.

As discussed above, one technique for learning a single template uses a player's role (e.g., point guard, power forward, etc.) A general role-based alignment method is described with respect to FIG. 11. Once the player detections are obtained at 1150, a formation template is either hand-crafted or learned unsupervised at 1160 (as described, e.g., in A. Bialkowski, P. Lucey, P. Carr, Y. Yue, S. Sridharan, and I. Matthews. 2014 and Large-Scale Analysis of Soccer Matches using Spatiotemporal Tracking Data. In ICDM and Patrick Lucey, Alina Bialkowski, Peter Carr, Stuart Morgan, Iain Matthews, and Yaser Sheikh. 2013. Representing and discovering adversarial team behaviors using player roles). The raw player detections in a frame are compared to the formation template to form a cost matrix at 1170. The Hungarian algorithm is then applied at 1180 to the cost matrix to yield a permutation matrix P, which assigns a designated role to each player in the frame. Thus, for every sample, the aligned data can be represented as a simple permutation of the original raw data, $$X_{aligned} = PX_{raw} \qquad (1)$$

where P is a square M×M permutation matrix and P(i, j)=1 indicates that role i is assigned to player j.

Figure 12:
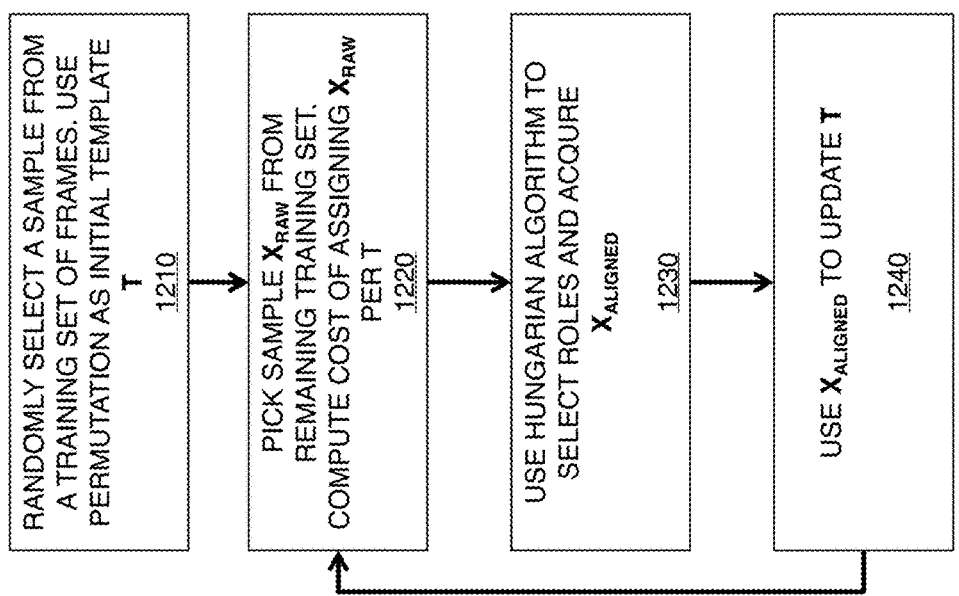
FIG. 12 is a flow diagram illustrating a method of aligning sports plays using a role-based process, in accordance with an embodiment of the present system.

More specifically, a role-based representation may be obtained by learning the template directly from data, resulting in better alignment. Turning to FIG. 12, such a method is described. Initially, at step 1210 a sample is selected from a training set of player data to form an initial permutation T. A new sample $x_{raw}$ is the chosen at step 1220 from the remaining frames in the training set, and the cost of assigning each player in $x_{raw}$ according to template T is computed. The Hungarian algorithm is then used at step 1230 to select the roles for each player in $x_{raw}$, resulting in $x_{aligned}$. At step 1240 $x_{aligned}$ is used to update template T through averaging. Steps 1220 to 1240 are then repeated until T converges.

Tree-Based Alignment

As discussed above, in an embodiment, the present system performs a tree-based alignment using multiple templates. Unlike role-based alignment, which enforces a global alignment that is agnostic to particular game-states and contexts, the tree-based alignment used in embodiments of the present system enable all the data to be permuted to get in the same frame of reference for further clustering to occur. This permits capture of, e.g., possession states—i.e., which side of the basketball court both teams are on (e.g., left-hand-side vs right-hand-side).

In some embodiments, the data alignment process learns a warping function W( ) that maximizes the similarity between all data points.

$$\underset{W}{argmin} \sum_{X_i, X_j \in \mathcal{X}} \|W(X_i) - W(X_j)\|_2 \qquad (2)$$

where $\mathcal{X}$ is a set of data points. In an embodiment, the warping function uses a template to compute a permutation matrix $P \in \mathbb{R}^{M \times M}$ that orders the M agents according to their relative positions so that feature correspondence can be preserved:

$$X^* = W(X) = PX \qquad (3)$$

where X* is the aligned data. P is a sparse matrix where only one element in each row is 1 while others are 0s. P(i, j)=1 indicates the agent j's new index is i after re-ordering.

The data is preferably not aligned indiscriminately, but instead is aligned within each hidden sub-class, so Eq. 2 can be rewritten as $$\underset{C,W}{argmin} \sum_{C_n \in C} \sum_{X_i, X_j \in C_n} \|W_n(X_i) - W_n(X_j)\|_2 \qquad (4)$$

where C is a set of hidden classes, W is a set of warping functions that corresponds to each class and $W_n$ is the warping function in class n. Previously, finding hidden classes without finely aligned data was difficult, as was effectively aligning the data prior to its division into certain classes. Embodiments overcome these shortcomings by computing C and W iteratively with a tree-structural approach.

Alignment

Turning to FIG. 13, an algorithm 1300 is described for learning a template for a class of examples as a warping function to align data, in accordance with an embodiment. The algorithm takes as input a class of examples at step 1301 and initializes the template with a random example from the class at step 1302. For each example in the class, the cost of assigning the agents per the current template is computed at step 1305, and a permutation matrix is computed at step 1306 for the example, using the Hungarian algorithm. The examples are aligned per their computed permutations at step 1307, and the template is updated by averaging at step 1309. This process is repeated until the template error is sufficiently small, or until a certain number of iterations have occurred. The resulting template canonically assigns each player to position in a template, represented as a permutation matrix that minimizes the overall assignment cost, which is returned at step 1312. This alignment method can be applied to sequence with any length. For example, when example X contains only single frame then the entire dataset is considered as one class, and this method is equivalent to the role-based alignment proposed by Lucey et al. in "Representing and Discovering Adversarial Team Behaviors using Player Roles," Computer Vision and Pattern Recognition (2013).

Class Discovery

Once alignment has been performed, the warping function can be re-written:

$$\underset{C}{\operatorname{argmin}} \sum_{C_n \in C} \sum_{X_i^*, X_j^* \in C_n} \|X_i^* - X_j^*\|_2 \quad (5)$$

which is an objective function for a clustering problem. As a clustering problem, a constraint is preferably used to limit the number of clusters it produces. On the other hand, it is preferable to avoid a large number of fine-grained clusters with very coarse alignment in the shallow layers. Thus, embodiments use an additional term to constrain the number of clusters in each node of the tree $$E(\mathcal{X}) = \frac{1}{|\mathcal{X}|} \sum_{C_k \in C} \sum_{X_i^* \in C_k} \frac{\|X_i^* - \mu_{kn}\|_2 - \|X_i^* - \mu_k\|_2}{\|X_i - \mu_{kn}\|_2} \quad (6)$$

where $\mu_k$ represents the mean of the cluster that example $X^*_i$ belongs to and $\mu_{kn}$ indicates the mean of the closest neighbor cluster of example $X^*_i$. Equation 6 measures the dissimilarity between neighboring clusters and how tightly the data is grouped within each cluster. When the number of clusters becomes too large, the similarity between neighboring clusters increases and E decreases as well. Thus, a goal is to maximize E to have the most discriminative clusters. In an embodiment, the data partitioning in each node is performed by attempting K-means clustering, with K ranging from 2 to 10. For each value of K, the score E is computed. The K that provides the maximum E is selected to split the data in the current node.

Tree Growth

Turning to FIG. 14, a method is described of learning an entire tree of multi-agent examples, in accordance with an embodiment. In general, the data is aligned and the hidden classes are found in an unsupervised manner. Algorithm 1300 is used to align the data in a subset, and then a clustering technique, such as described above, is used to split them into finer clusters. The templates in each node are preferably also aligned so that the consistency of agents permutation can be preserved, as multi-agent behaviors in real world are continuous and correlated between those hidden-classes. Accordingly, the template at every node is aligned to its parent template in the previous layer. Then the same process repeats for each node in the tree. During the learning process, the clusters C and templates T at each layer are stored for the aligning process. $\mathcal{X}_n^l$ denotes a subset of data in node n at layer l and the same notation is also applied to C and Γ.

The process of Algorithm 1400 proceeds until one or both of two stop criterions are met at step 1411: 1) a pre-defined minimum number of examples in each leaf node, 2) a pre-defined depth. In order to find the optimal depth of our tree, the loss in Equation 4 is computed at each layer at step 1410.

Tree Learning

As discussed above, according to an embodiment, an optimal tree-structure is learned with two alternating steps: alignment and data partitioning. The alignment in each node follows the same general process of role-based alignment. For each group of data-points assigned to each partition, a template is learned based on only these points, with this template aligned to the template at the level-above. Once the template learning has occurred, the data is further partitioned into further clusters. Such training process repeats in every node, preferably using k-means clustering at each layer.

Initially, at each layer the data is split into two (K=2), which empirically has worked well for the first 3 layers. However, empirical results have shown an imbalance in the number of examples assigned to each cluster in the deeper layers. To circumvent this issue, to determine the number of clusters K, the clustering process is repeated with K equals to 2-10. For each output, a Silhouettes analysis is preferably conducted to find the best K. The Silhouette score is used to find the K that generates the most dissimilar clusters.

Figure 15:
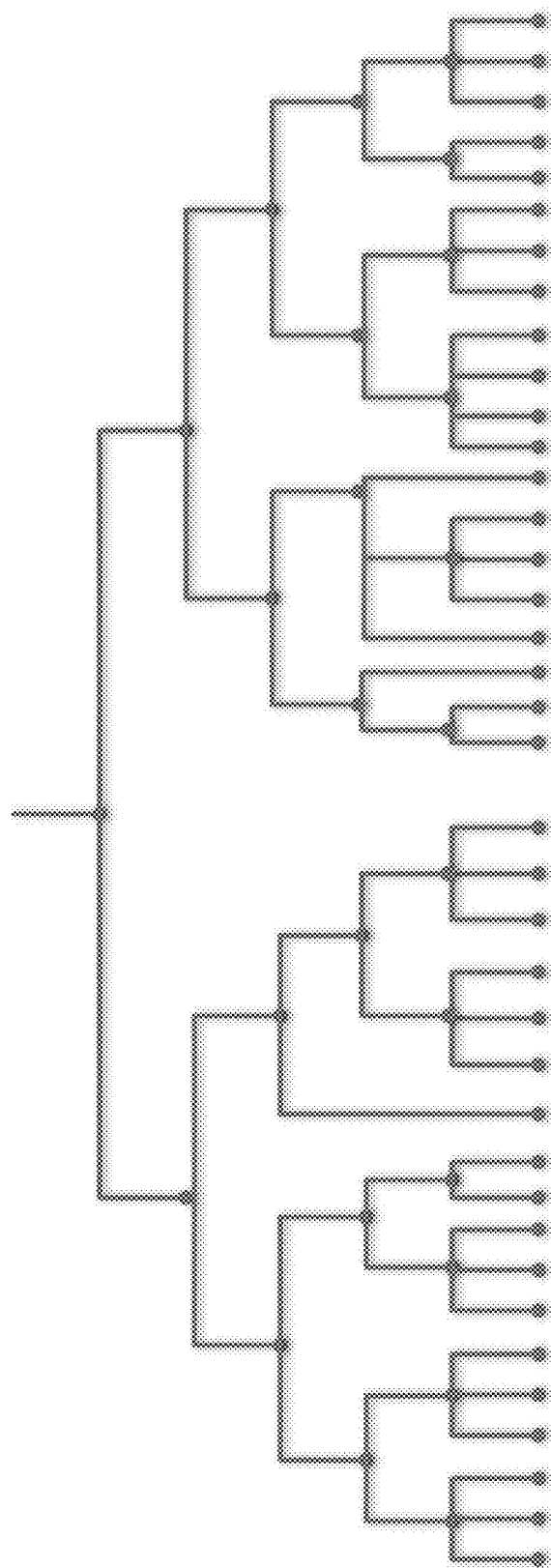
FIG. 15 is an illustration of a collection of sports play templates represented as a tree, in accordance with an embodiment of the present system.

To determine how many layers and clusters are required, in an embodiment the tree is first trained on a training set of data, and is evaluated based on performance in terms of reconstruction error on the test set. To do this, at each layer, K-means clustering is applied based on the current aligned data with different K, and the within-cluster-error is used to inspect the reconstruction error. The average $l_2$ distance per frame per player between samples and their cluster centers is computed. FIG. 15 shows the visualization of a tree of templates—consisting of 5 layers and 38 bottom-layer templates.

With respect to FIG. 16, empirical results are shown based on overall reconstruction error. On the left, alignment using a tree of templates is shown to out-perform the non-aligned and role-aligned methods. On the right, using a 5-layer tree is shown to achieve the best reconstruction error on the test set.

Figure 17:
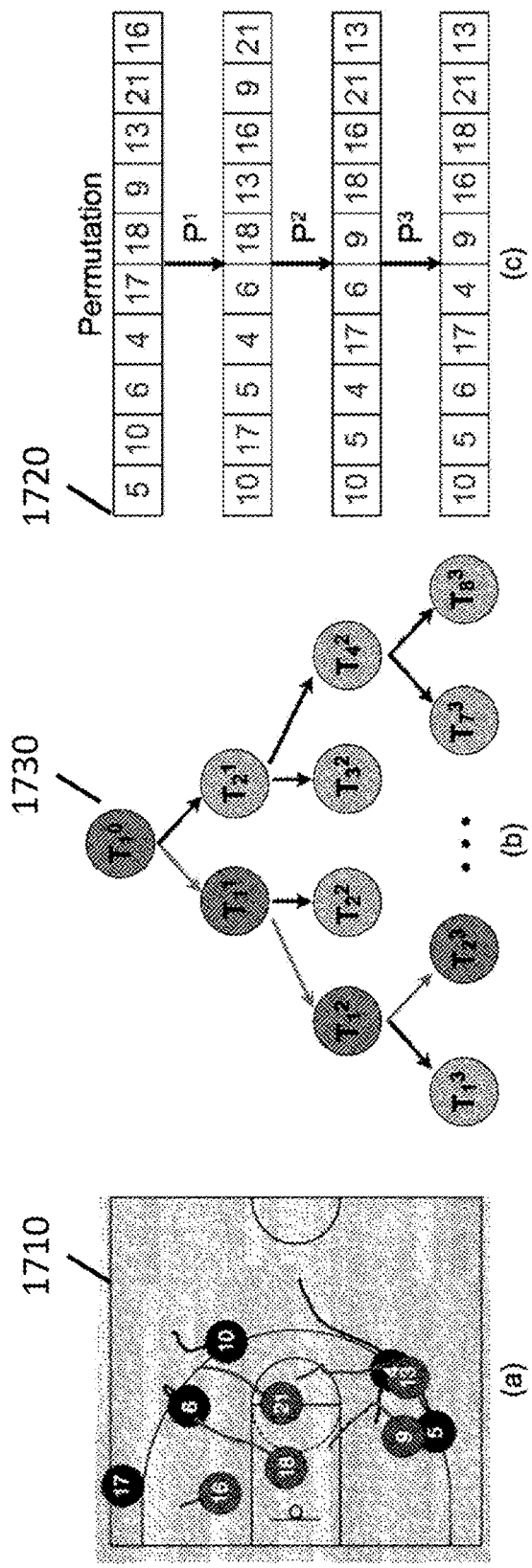
FIG. 17 is a diagram illustrating an example of applying tree-based alignment to a sports play, in accordance with an embodiment of the present system.

Turning to FIG. 17, an example of applying the tree-based alignment is shown, in accordance with an embodiment. Given an input frame 1710, the player permutation 1720 is first aligned by the global template $T_1^0$ in the root node 1730. Then, it moves to a child node in the next layer and is permuted again. Every time it reaches a new node n at layer l, the player permutation will be aligned again by the template $T_n^l$ and the final aligned data is returned by the leaf node. After coarse alignment, some hidden structures can be discovered, which allows better alignment in the next layer. After repeating this process for several times, fine structure may be found to align the data. The aligned data in the tree-based method can be written as:

$$X_{aligned} = P^L(\ldots(P^2(P^1 X_{raw}))) \quad (7)$$

where $P^l$ is the permutation matrix of input X in layer l. In essence it is a composition of permutation matrices to yield the optimal ordering of the multiple agents which allows for basic clustering to occur.

Figure 18:
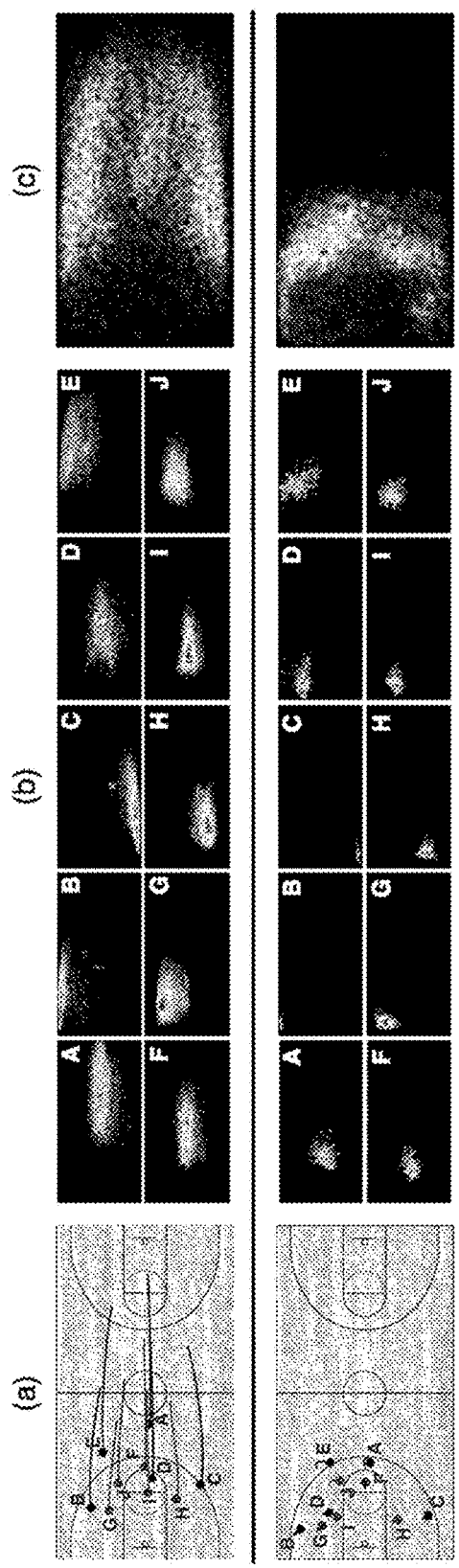
FIG. 18 is a diagram illustrating an example of applying tree-based alignment to a sports play, in accordance with an embodiment of the present system.

FIG. 18a illustrates the centroids of two cluster centers that have been applied on a test set of two 4 second plays. The heat-map of each player's position is shown in FIG. 18b. The ball trajectory is shown in FIG. 18c. The heat-map associated with each agent (A-E=first team, F-J=second team) is unimodal when compared to the ball trajectory, which is multimodal. Thus, even when player motions may take a similar path, the ball has multiple distinctive paths it can take.

Ball Trajectory Prediction

In accordance with an embodiment, tree-based alignment as described herein is used to accurately predict a complex task in an efficient manner. Tree-based alignment may be used, for example, to predict the trajectory of a ball in a sporting event during a time frame, given the tracking data of players during that time frame or a previous time frame. Previous techniques for solving this problem, such as using a convolutional neural network, have yielded sub-optimal results. Image noise, for instance, (i.e., rotation, translation, illumination, etc.) is not present in multi-agent data, and thus a convolution operator, which provides invariance to such image noise, is obsolete or unnecessary. Instead, embodiments use a standard-feed forward neural network, since the predominant noise problem (permutation) has been normalized. This permits the use of the aligned raw multi-agent data (which is compact compared to the high-dimensional image representation), ensuring quick training time. Additionally, no convolutional layers are necessary.

Figure 19:
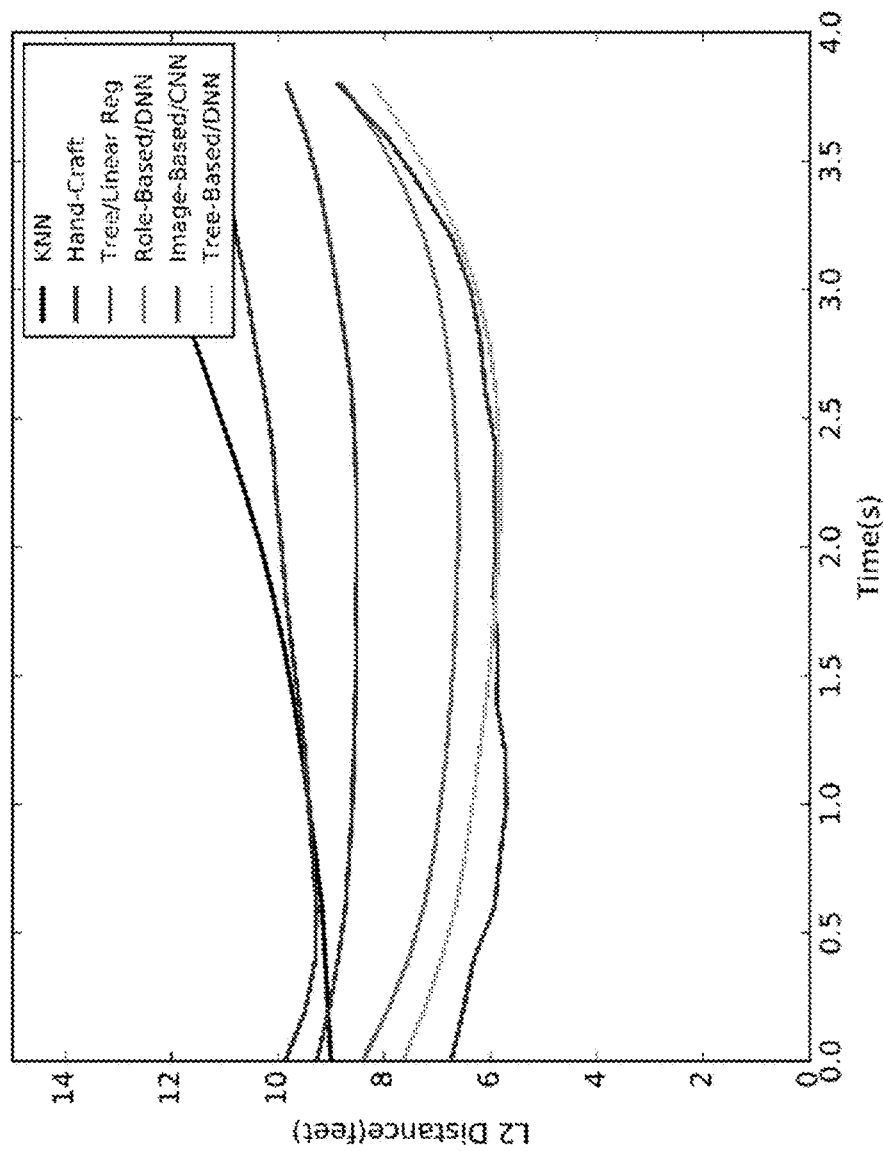
FIG. 19 is a diagram illustrating empirical results for predictive error for different alignment processes, in accordance with an embodiment of the present system.

Empirical results using a test data set are shown in FIG. 19, showing the results of (1) role-aligned+deep neural network (DNN), (2) image-based+convolutional neural network (CNN), and (3) tree-aligned+deep neural network (DNN). Also shown are the results for comparison: (4) K-nearest-neighbor (KNN)—as explained below, (5) handcrafted representation (computing domain specific features by an expert (e.g., velocity, acceleration, relative distance/angle) to predict the ball with a linear regressor), and (6) tree+linear regressor: a linear regressor is learned on each leaf node for prediction.

The metric used for comparison is $l_2$ distance per frame, and the distance series along 4 seconds is visualized to compare different approaches.

$$\in_t = |x_t - x^*_t|_2 \qquad (8)$$

where $\in_t$ is the $l_2$ distance at frame t, and $x_t$ and $x^*_t$ are the predicted ball location and ground truth ball location at frame t respectively. The results in FIG. 19 are based on a database of 67,291 plays in a training set, with the model evaluated on 7,216 testing samples. The tree-based+DNN outperformed all the naive methods and the role-based+DNN. In terms of performance compared to the image-based+CNN, the tree-based method was essentially equivalent. However, in terms of training the model, using the aligned approaches above on the raw-data results in over an order of magnitude of time savings over using the image-based approach (1-3 hours vs 73 hours) due to the much lower dimensional signal.

Embodiments further use tree-based alignment to predict diverse solutions for ball trajectory on a given input play, which is useful because evaluating performance on the top-k solutions may be a better gauge of performance compared to just the top solution. The previous DNN/CNN approaches cannot provide a diverse solution set (e.g., CNN can give top-k results of each frame but not the whole trajectory). In the tree-based approach presently described, however, data is inherently divided into groups during the alignment process, thus, the boundary of ball trajectory in each leaf node is constrained, enabling diverse prediction.

Figure 20:
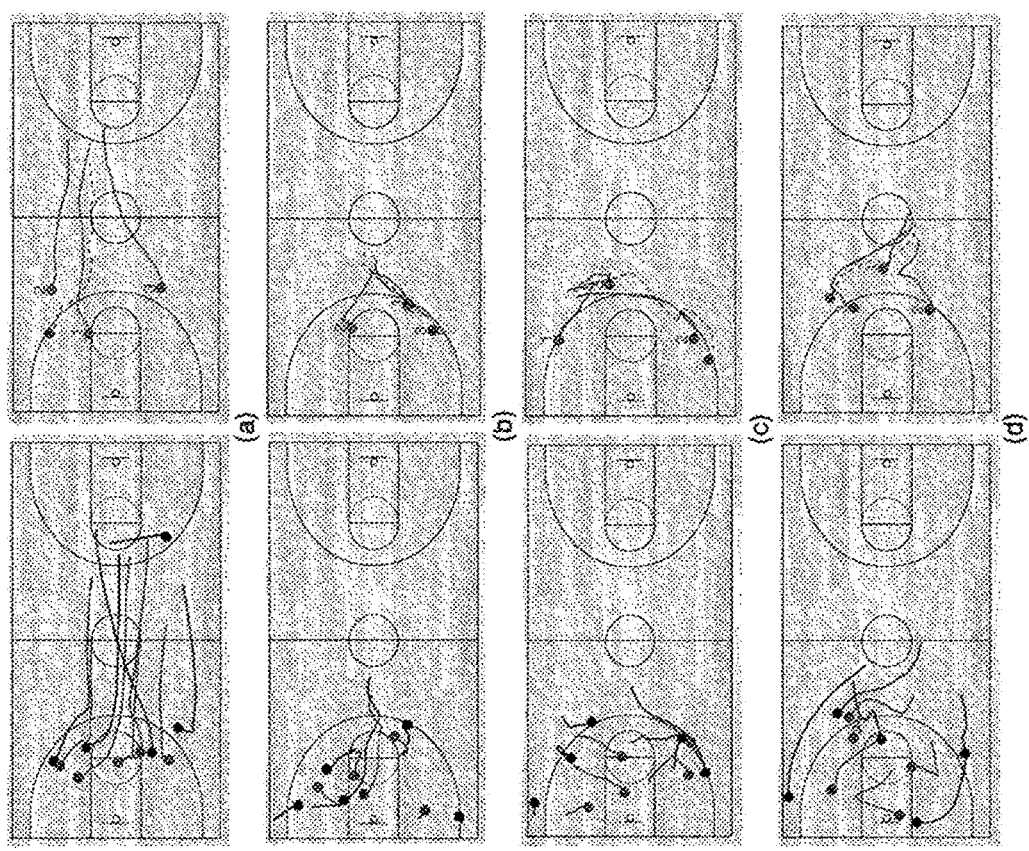
FIG. 20 is a diagram illustrating examples of diverse trajectory predictions, in accordance with an embodiment of the present system.

To obtain a diverse set of predictions, an embodiment uses a simple K-nearest-neighbor (KNN) approach. Given a testing sample, after it reaches the target leaf node, a KNN search is conducted within the data group in this leaf node, significantly reducing the searching space. FIG. 20 shows the results of four examples with diverse solutions, where 50 nearest-neighbors have been selected by computing the $l_2$ distance between sample and each data point. An affinity propagation is applied to cluster the 50 neighbors, which does not require pre-determination of the number of clusters. The average play in each cluster is considered to be the prediction result, which are then ranked by the cluster size. In FIG. 20, the top-3 results of some examples are shown. The input play is shown on the left. The dotted-path on the right examples is the ground truth (i.e., the ball's actual path), and top-3 predictions are numbered by their ranking in each example.

Embodiments further are used to predict other useful information, such as through "ghosting." Using the tree-based representation and DNN as described above, for example, a system may take as input a subset of information for a given sports play. For example, the input subset may be player positional information only, without ball position information. The output from the DNN could be the remaining play information, such as the ball position. Alternatively, the input may be positional information for a subset of the active players, while the output is the predicted position information for the other players. Using these ghosting techniques, embodiments of the presently described system can, for example, display "ghosts" of a likely defensive scenario for any given input play.

In addition to the examples of basketball and soccer described throughout this disclosure, embodiments of the system are not limited to these particular sports, and the system is suitable for use in a variety of other sports, including but not limited to, for example, rugby, volleyball and American football.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for indexing a database of plays for a sport in a tree data structure having a root node and a number of layers of child nodes, each play including two-dimensional positional tracking data for the objects on a playing surface and a time interval, and each node having associated with it a set of plays from the database, the method comprising:
    for each node in a first layer of the tree:
        determining a template play for the node;
        aligning the template to the node's parent's template; and
        aligning each play in the node's set of plays to the aligned template for the node;
    determining whether a termination condition has been satisfied for the first layer; and
    if the termination condition has not been satisfied, then discriminatively clustering the aligned plays at each node in the first layer to partition each node's set of plays into an optimal number of clusters, each node's partitioned clusters being represented as a set at a child node in a second layer of the tree.

2. The method of claim 1, wherein determining the template play for the node comprises:
    selecting a first play in the set of plays associated with the node, for use as an initial template;
    calculating a cost matrix for each play in the set of plays with respect to the initial template, the cost matrix representing a quantitative difference between the trajectories of each tracked object in the play and each object in the template;
    determining a permutation matrix for the play with respect to the initial template;
    aligning the set of plays by applying the permutation matrix; and
    updating the initial template with the average values of the aligned set of plays.

3. The method of claim 1, wherein discriminatively clustering the aligned plays at a node comprises:
    generating sets of proposed clusters using a K-means clustering process, for values of K ranging from 2 to at least 6;
    for each set of proposed clusters, calculating a metric for the dissimilarity between neighboring clusters and the tightness of the plays within each cluster; and
    accepting the set of proposed clusters that maximize the metric over the range of K-values.

4. The method of claim 1, further comprising:
    training a deep neural network (DNN) with data for a set of the aligned plays in the database;
    inputting a first subset of data for a play to the DNN;
    obtaining a prediction from the DNN for a second subset of data for the play.

5. The method of claim 4, wherein the first subset of data represents player trajectories and the second subset of data represents a ball trajectory.

6. The method of claim 4 wherein the first subset of data represents positional information for a first subset of players and the second subset of data represents positional information for a second subset of players.

7. The method of claim 1, wherein the sport is one of: basketball, soccer, rugby, American football or volleyball.

8. A computer-implemented graphical user interface and interactive sports analytics system comprising:
    a database storing a plurality of historical plays for a given sport, each historical play comprising real-world positional information and game event information over a window of time for objects on a playing surface, the objects comprising players and a ball; and
    a computing device comprising a display device, the computing device coupled to the database and operable to generate a display on the display device for representing a play for the given sport, the display comprising:
        a graphical depiction of the playing surface and the objects corresponding to real-world positional information for the play; and
        an object selection tool for receiving a user selection of a subset of objects in the graphical depiction, the display modifying the graphical depiction for the selected objects with positional information generated based on at least the historical plays in the database.

9. The system of claim 8, wherein the given sport is basketball and the user selection is the position of the basketball.

10. The system of claim 9, wherein the user selection is a subset of player representations in the graphical depiction.

11. The system of claim 8, the display further comprising a retrieved play region for presenting historical plays retrieved from the database that are similar to the represented play with respect to positional information and/or game event information.

12. The system of claim 11, the display further comprising a video display region for presenting real-world video of the retrieved historical plays.

* * * * *